United States Patent
Huang et al.

(10) Patent No.: US 12,219,604 B2
(45) Date of Patent: Feb. 4, 2025

(54) COLLISION RESOLUTION FOR ACKNOWLEDGEMENT OR NEGATIVE ACKNOWLEDGEMENT FEEDBACK MESSAGES

(71) Applicant: QUALCOMM Incorporated, San Diego, CA (US)

(72) Inventors: Yi Huang, San Diego, CA (US); Jing Sun, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/657,022

(22) Filed: Mar. 29, 2022

(65) Prior Publication Data

US 2023/0051501 A1    Feb. 16, 2023

Related U.S. Application Data

(60) Provisional application No. 63/260,256, filed on Aug. 13, 2021.

(51) Int. Cl.
*H04L 1/1867* (2023.01)
*H04L 1/1812* (2023.01)
(Continued)

(52) U.S. Cl.
CPC ....... *H04W 74/0825* (2013.01); *H04L 1/1819* (2013.01); *H04L 1/1854* (2013.01); *H04L 5/0055* (2013.01); *H04W 72/23* (2023.01)

(58) Field of Classification Search
CPC .............. H04W 74/0825; H04W 72/23; H04L 1/1819; H04L 1/1854
See application file for complete search history.

(56) References Cited

U.S. PATENT DOCUMENTS 10,341,061 B2    7/2019    Chen et al.
2008/0232284 A1*  9/2008    Dalsgaard ............. H04W 72/23
                                                        370/310
(Continued)

FOREIGN PATENT DOCUMENTS

WO    2017172208        10/2017
WO    WO-2018143738 A1 *  8/2018  ........... H04L 5/0044
(Continued)

OTHER PUBLICATIONS

3GPP TSG RAN WG1 Meeting#84bis, R1-162678 Title:Reporting geo informatoon to eNB (Year: 2016).*

(Continued)

*Primary Examiner* — Faruk Hamza
*Assistant Examiner* — Abusayeed M Haque
(74) *Attorney, Agent, or Firm* — QUALCOMM Incorporated

(57) ABSTRACT

Various aspects of the present disclosure generally relate to wireless communication. In some aspects, a user equipment (UE) may receive an indication of a first set of resources associated with a semi-persistent scheduling (SPS) acknowledgement/negative acknowledgement (A/N) feedback message, wherein the SPS A/N feedback message is deferred to a second set of resources by the UE. The UE may receive an indication of a third set of resources associated with a dynamic A/N feedback message, wherein the second set of resources and the third set of resources are associated with a collision. The UE may perform an action based on the second set of resources and the third set of resources being associated with the collision. The UE may transmit at least one of the SPS A/N feedback message or the dynamic A/N feedback message based on performing the action. Numerous other aspects are described.

26 Claims, 11 Drawing Sheets

(51) Int. Cl.
  *H04L 1/1829* (2023.01)
  *H04L 5/00* (2006.01)
  *H04W 72/23* (2023.01)
  *H04W 74/0808* (2024.01)

(56) References Cited

U.S. PATENT DOCUMENTS

| | | | | |
|---|---|---|---|---|
| 2021/0076409 A1* | 3/2021 | Goto | ............... | H04W 72/1268 |
| 2021/0243784 A1* | 8/2021 | Goto | ............... | H04W 72/21 |
| 2021/0360685 A1* | 11/2021 | Huang | ............... | H04B 7/0697 |
| 2023/0422235 A1* | 12/2023 | Singh | ............... | H04L 1/1887 |

FOREIGN PATENT DOCUMENTS

| | | | | | |
|---|---|---|---|---|---|
| WO | WO-2019137481 A1 * | 7/2019 | | ............ | H04L 1/1812 |
| WO | WO-2022039959 A1 * | 2/2022 | | ............ | H04B 17/327 |

OTHER PUBLICATIONS

3GPP TSG-RAN WG2 Meeting#98, R2-1704497 Title:Adding UE Wi-FI MAC Address to WLAN Measurment Information (Year: 2017).*

3GPP TSG-RAN WG2 Meeting#99, R2-1708303 Title:Quick RRC Release (Year: 2017).*

International Search Report and Written Opinion—PCT/US2022/074069—ISA/EPO—Nov. 11, 2022.

Moderator (Nokia): "Moderator Summary #2 on HARQ-ACK Feedback Enhancements for NR Rel-17 URLLC/IIoT", 3GPP TSG-RAN WG1 Meeting #104-e, R1-2101818, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 175 Pages, Feb. 8, 2021, XP051977624, pp. 24-35.

NTT Docomo., et al., "Discussion on HARQ-ACK Feedback Enhancements for Rel.17 URLLC", 3GPP TSG RAN WG1 #104-e, R1-2101612, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 10 Pages, Jan. 19, 2021, XP051971767, pp. 1-3.

Spreadtrum Communications: "Discussion on HARQ-ACK Feedback Enhancements", 3GPP TSG RAN WG1 #104b-e, R1-2102454, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 6 Pages, Apr. 7, 2021, XP052177162, pp. 1-3.

* cited by examiner

COLLISION RESOLUTION FOR ACKNOWLEDGEMENT OR NEGATIVE ACKNOWLEDGEMENT FEEDBACK MESSAGES

CROSS-REFERENCE TO RELATED APPLICATION

This Patent Applications claims priority to U.S. Provisional Patent Application No. 63/260,256, filed on Aug. 13, 2021, entitled "COLLISION RESOLUTION FOR ACKNOWLEDGEMENT OR NEGATIVE ACKNOWLEDGEMENT FEEDBACK MESSAGES," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for collision resolution for acknowledgement (ACK) or negative acknowledgement (NACK) feedback messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive an indication of a first set of resources associated with a semi-persistent scheduling (SPS) acknowledgement or negative acknowledgement (A/N) feedback message, wherein the SPS A/N feedback message is deferred to a second set of resources by the UE. The one or more processors may be configured to receive an indication of a third set of resources associated with a dynamic A/N feedback message, wherein the second set of resources and the third set of resources are associated with a collision. The one or more processors may be configured to perform an action associated with at least one of the SPS A/N feedback message or the dynamic A/N feedback message based at least in part on the second set of resources and the third set of resources being associated with the collision. The one or more processors may be configured to transmit at least one of the SPS A/N feedback message or the dynamic A/N feedback message based at least in part on performing the action.

Some aspects described herein relate to a network entity for wireless communication. The network entity may include a memory and one or more processors coupled to the memory. The one or more processors may be configured to transmit, to a UE, an indication of a first set of resources associated with an SPS A/N feedback message, wherein the SPS A/N feedback message is deferred to a second set of resources by the UE. The one or more processors may be configured to transmit, to the UE, an indication of a third set of resources associated with a dynamic A/N feedback message, wherein the second set of resources and the third set of resources are associated with a collision. The one or more processors may be configured to perform an action based at least in part on the second set of resources and the third set of resources being associated with the collision. The one or more processors may be configured to receive, from the UE, at least one of the SPS A/N feedback message or the dynamic A/N feedback message based at least in part on performing the action.

Some aspects described herein relate to a method of wireless communication performed by a UE. The method may include receiving an indication of a first set of resources associated with an SPS A/N feedback message, wherein the SPS A/N feedback message is deferred to a second set of resources by the UE. The method may include receiving an indication of a third set of resources associated with a dynamic A/N feedback message, wherein the second set of resources and the third set of resources are associated with a collision. The method may include performing an action associated with at least one of the SPS A/N feedback message or the dynamic A/N feedback message based at least in part on the second set of resources and the third set of resources being associated with the collision. The method may include transmitting at least one of the SPS A/N feedback message or the dynamic A/N feedback message based at least in part on performing the action.

Some aspects described herein relate to a method of wireless communication performed by a network entity. The method may include transmitting, to a UE, an indication of a first set of resources associated with an SPS A/N feedback message, wherein the SPS A/N feedback message is deferred to a second set of resources by the UE. The method may include transmitting, to the UE, an indication of a third set of resources associated with a dynamic A/N feedback message, wherein the second set of resources and the third set of resources are associated with a collision. The method may include performing an action based at least in part on the second set of resources and the third set of resources being associated with the collision. The method may include receiving, from the UE, at least one of the SPS A/N feedback message or the dynamic A/N feedback message based at least in part on performing the action.

Some aspects described herein relate to a non-transitory computer-readable medium that stores a set of instructions for wireless communication by a UE. The set of instructions, when executed by one or more processors of the UE, may cause the UE to receive an indication of a first set of resources associated with an SPS A/N feedback message, wherein the SPS A/N feedback message is deferred to a second set of resources by the UE. The set of instructions, when executed by one or more processors of the UE, may cause the UE to receive an indication of a third set of resources associated with a dynamic A/N feedback message, wherein the second set of resources and the third set of resources are associated with a collision. The set of instructions, when executed by one or more processors of the UE, may cause the UE to perform an action associated with at least one of the SPS A/N feedback message or the dynamic A/N feedback message based at least in part on the second set of resources and the third set of resources being associated with the collision. The set of instructions, when executed by one or more processors of the UE, may cause the UE to transmit at least one of the SPS A/N feedback message or the dynamic A/N feedback message based at least in part on performing the action.

Some aspects described herein relate to a non-transitory computer-readable medium that stores a set of instructions for wireless communication by a network entity. The set of instructions, when executed by one or more processors of the network entity, may cause the network entity to transmit, to a UE, an indication of a first set of resources associated with an SPS A/N feedback message, wherein the SPS A/N feedback message is deferred to a second set of resources by the UE. The set of instructions, when executed by one or more processors of the network entity, may cause the network entity to transmit, to the UE, an indication of a third set of resources associated with a dynamic A/N feedback message, wherein the second set of resources and the third set of resources are associated with a collision. The set of instructions, when executed by one or more processors of the network entity, may cause the network entity to perform an action based at least in part on the second set of resources and the third set of resources being associated with the collision. The set of instructions, when executed by one or more processors of the network entity, may cause the network entity to receive, from the UE, at least one of the SPS A/N feedback message or the dynamic A/N feedback message based at least in part on performing the action.

Some aspects described herein relate to an apparatus for wireless communication. The apparatus may include means for receiving an indication of a first set of resources associated with an SPS A/N feedback message, wherein the SPS A/N feedback message is deferred to a second set of resources by the apparatus. The apparatus may include means for receiving an indication of a third set of resources associated with a dynamic A/N feedback message, wherein the second set of resources and the third set of resources are associated with a collision. The apparatus may include means for performing an action associated with at least one of the SPS A/N feedback message or the dynamic A/N feedback message based at least in part on the second set of resources and the third set of resources being associated with the collision. The apparatus may include means for transmitting at least one of the SPS A/N feedback message or the dynamic A/N feedback message based at least in part on performing the action.

Some aspects described herein relate to an apparatus for wireless communication. The apparatus may include means for transmitting, to a UE, an indication of a first set of resources associated with an SPS A/N feedback message, wherein the SPS A/N feedback message is deferred to a second set of resources by the UE. The apparatus may include means for transmitting, to the UE, an indication of a third set of resources associated with a dynamic A/N feedback message, wherein the second set of resources and the third set of resources are associated with a collision. The apparatus may include means for performing an action based at least in part on the second set of resources and the third set of resources being associated with the collision. The apparatus may include means for receiving, from the UE, at least one of the SPS A/N feedback message or the dynamic A/N feedback message based at least in part on performing the action.

Aspects generally include a method, apparatus, system, computer program product, non-transitory computer-readable medium, user equipment, base station, network node, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
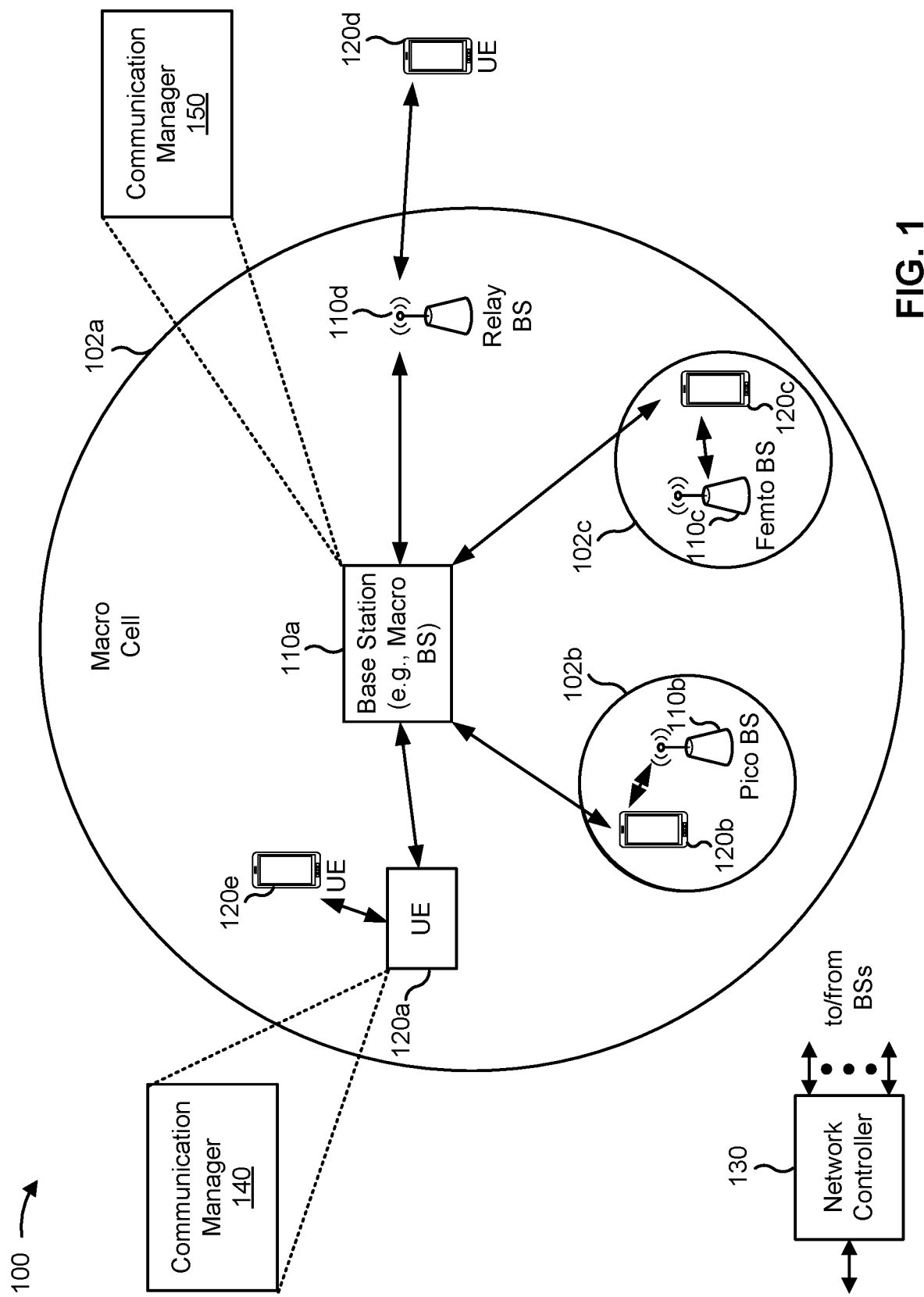
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a first set of resources associated with a semi-persistent scheduling (SPS) acknowledgement or negative acknowledgement (A/N) feedback message, wherein the SPS A/N feedback message is deferred to a second set of resources by the UE; receive an indication of a third set of resources associated with a dynamic A/N feedback message, wherein the second set of resources and the third set of resources are associated with a collision; perform an action associated with at least one of the SPS A/N feedback message or the dynamic A/N feedback message based at least in part on the second set of resources and the third set of resources being associated with the collision; and transmit at least one of the SPS A/N feedback message or the dynamic A/N feedback message based at least in part on performing the action. Additionally, or alternatively, the communication manager 140 may perform one or more other operations described herein.

In some aspects, a network entity (shown as the base station 110 in FIG. 1 as an example) may include a communication manager 150. As described in more detail elsewhere herein, the communication manager 150 may transmit, to a UE 120, an indication of a first set of resources associated with an SPS A/N feedback message, wherein the SPS A/N feedback message is deferred to a second set of resources by the UE; transmit, to the UE 120, an indication of a third set of resources associated with a dynamic A/N feedback message, wherein the second set of resources and the third set of resources are associated with a collision; perform an action based at least in part on the second set of resources and the third set of resources being associated with the collision; and receive, from the UE 120, at least one of the SPS A/N feedback message or the dynamic A/N feedback message based at least in part on performing the action. Additionally, or alternatively, the communication manager 150 may perform one or more other operations described herein.

As indicated above, FIG. 1 is provided as an example. Other examples may differ from what is described with regard to FIG. 1.

Figure 2:
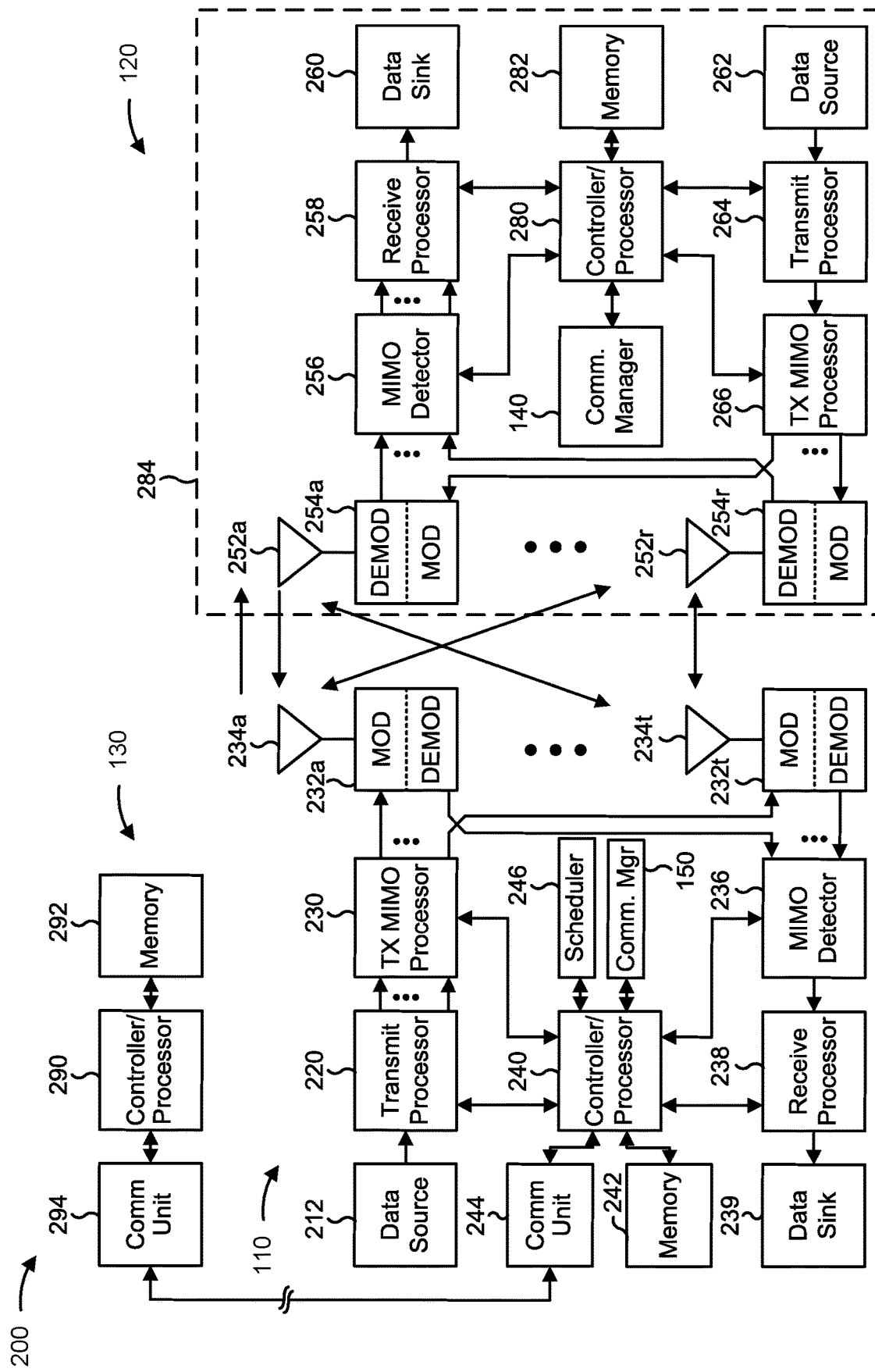
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with collision resolution for acknowledgement (ACK) or negative acknowledgement (NACK) feedback messages, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving an indication of a first set of resources associated with an SPS A/N feedback message, wherein the SPS A/N feedback message is deferred to a second set of resources by the UE; means for receiving an indication of a third set of resources associated with a dynamic A/N feedback message, wherein the second set of resources and the third set of resources are associated with a collision; means for performing an action associated with at least one of the SPS A/N feedback message or the dynamic A/N feedback message based at least in part on the second set of resources and the third set of resources being associated with the collision; and/or means for transmitting at least one of the SPS A/N feedback message or the dynamic A/N feedback message based at least in part on performing the action. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting, to a UE 120, an indication of a first set of resources associated with an SPS A/N feedback message, wherein the SPS A/N feedback message is deferred to a second set of resources by the UE; means for transmitting, to the UE 120, an indication of a third set of resources associated with a dynamic A/N feedback message, wherein the second set of resources and the third set of resources are associated with a collision; means for performing an action based at least in part on the second set of resources and the third set of resources being associated with the collision; and/or means for receiving, from the UE 120, at least one of the SPS A/N feedback message or the dynamic A/N feedback message based at least in part on performing the action. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
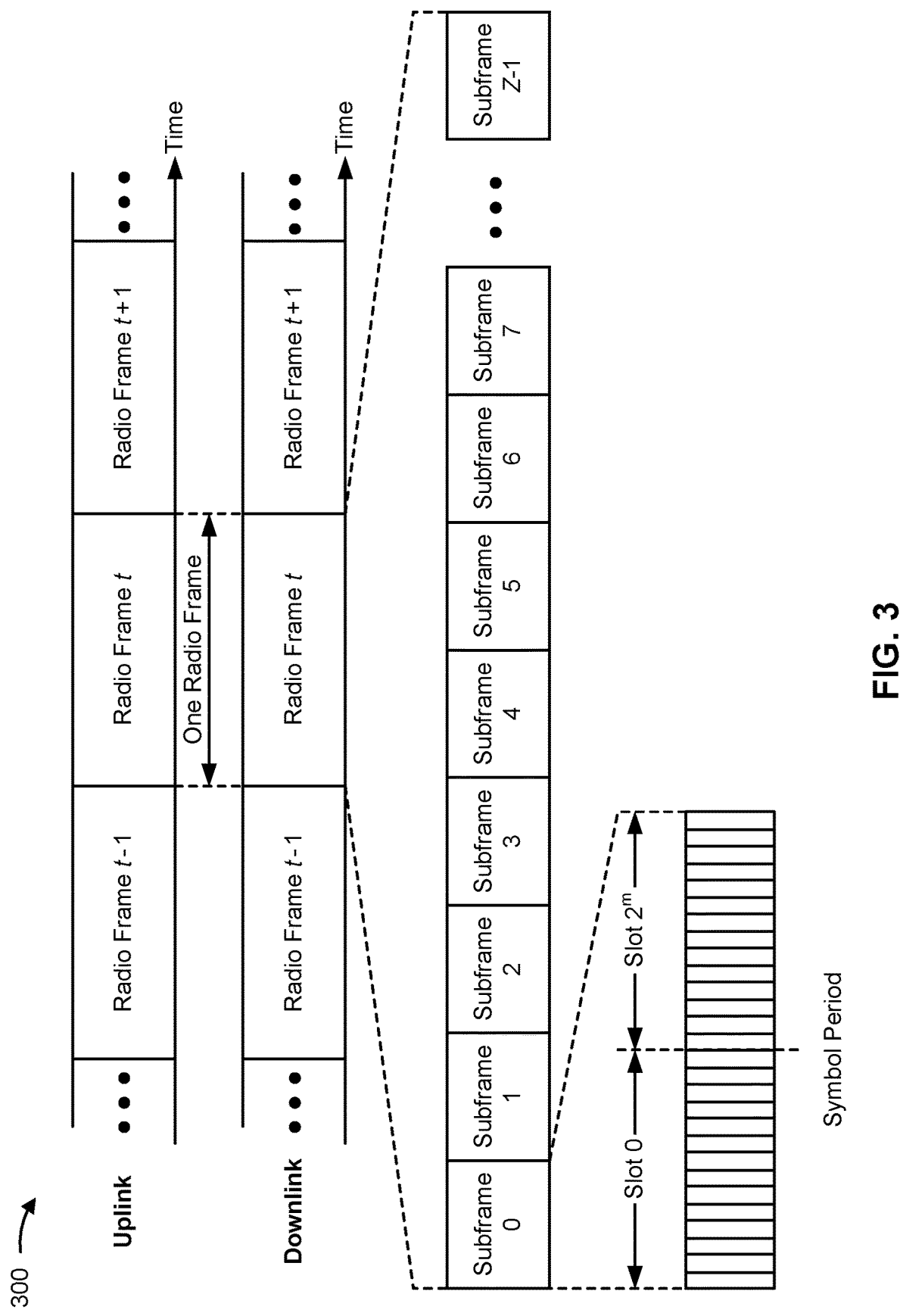
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, or another number). As used herein, "slot" may refer to a portion of a subframe, which in turn may be a fraction of a radio frame within an LTE, 5G, or other wireless communication structure. Each slot may include a set of L symbol periods. As used herein, "symbol" may refer to an OFDM symbol or another similar symbol within a slot. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some examples, a scheduling unit for the FDD may be frame-based, subframe-based, slot-based, mini-slot based, or symbol-based.

In some examples, a frame structure may include time division duplexing (TDD). For example, a slot (and/or symbol) may be designated for uplink communications (e.g., an uplink slot or an uplink symbol), may be designated for downlink communications (e.g., a downlink slot or a downlink symbol), and/or may be designated for both uplink communications and downlink communications (e.g., a flexible slot, a flexible symbols, a special slot, or a special symbol). In other words, a slot (and/or symbol) may be configured with a link direction for transmission, such as downlink (D) or uplink (U). In some examples, the link direction for a slot may be dynamically configured. A slot (and/or symbol) may also be configured as a special (or flexible) slot (S) that may include a guard time for switching link directions.

As indicated above, FIG. 3 is provided as an example. Other examples may differ from what is described with respect to FIG. 3.

Figure 4:
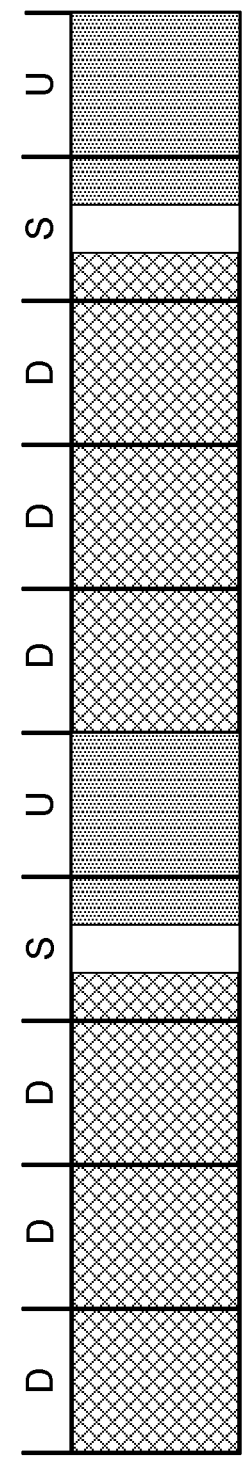
FIG. 4 is a diagram illustrating an example of slot types, in accordance with the present disclosure.

FIG. 4 is a diagram illustrating an example 400 of slot types, in accordance with the present disclosure. In some examples, a frame may have $10 \times 2^\mu$ slots, where μ is related to a subcarrier space that is used by a network. The network may configure a slot pattern with a designated slot type for each slot.

FIG. 4 shows 10 slots, where the first few slots (e.g., the first three slots as shown in FIG. 4) are for downlink transmission (D), and a next slot is a special (S) slot. In FIG. 4, both special slots include resource elements (REs) for downlink transmission (all subcarriers but a limited quantity of symbols), a guard time, and REs for uplink transmission (all subcarriers but also a limited quantity of symbols). The guard time may be configured to enable wireless communication devices (e.g., network entities, base stations, UEs, or other wireless communication devices operating in the wireless network) to switch from communicating downlink communications to communicating uplink communications, or vice versa. For example, the guard time may be a period of time during which no communications are scheduled. The wireless communication devices may use the guard time to switch and/or configure radio frequency components (e.g., radio frequency front end components) for communicating in a different link direction. In the slot pattern shown by FIG. 4, a slot for uplink transmission is adjacent to and immediately follows each special slot. Accordingly, the slot pattern in FIG. 4 may be noted as "DDDSUDDDSU". Other slot type patterns are possible. For example, a base station may configure the slot type pattern (e.g., a TDD pattern) for a cell associated with the base station.

For example, "downlink slot," "DL slot," or "D slot" may refer to a slot during which only downlink communications are permitted to be transmitted and/or scheduled. "Uplink slot," "UL slot," or "U slot" may refer to a slot during which only uplink communications are permitted to be transmitted and/or scheduled. "Special slot" or "S slot" may refer to a slot during which both uplink communications and downlink communications are permitted to be transmitted and/or scheduled.

As indicated above, FIG. 4 is provided as an example. Other examples may differ from what is described with respect to FIG. 4.

Figure 5:
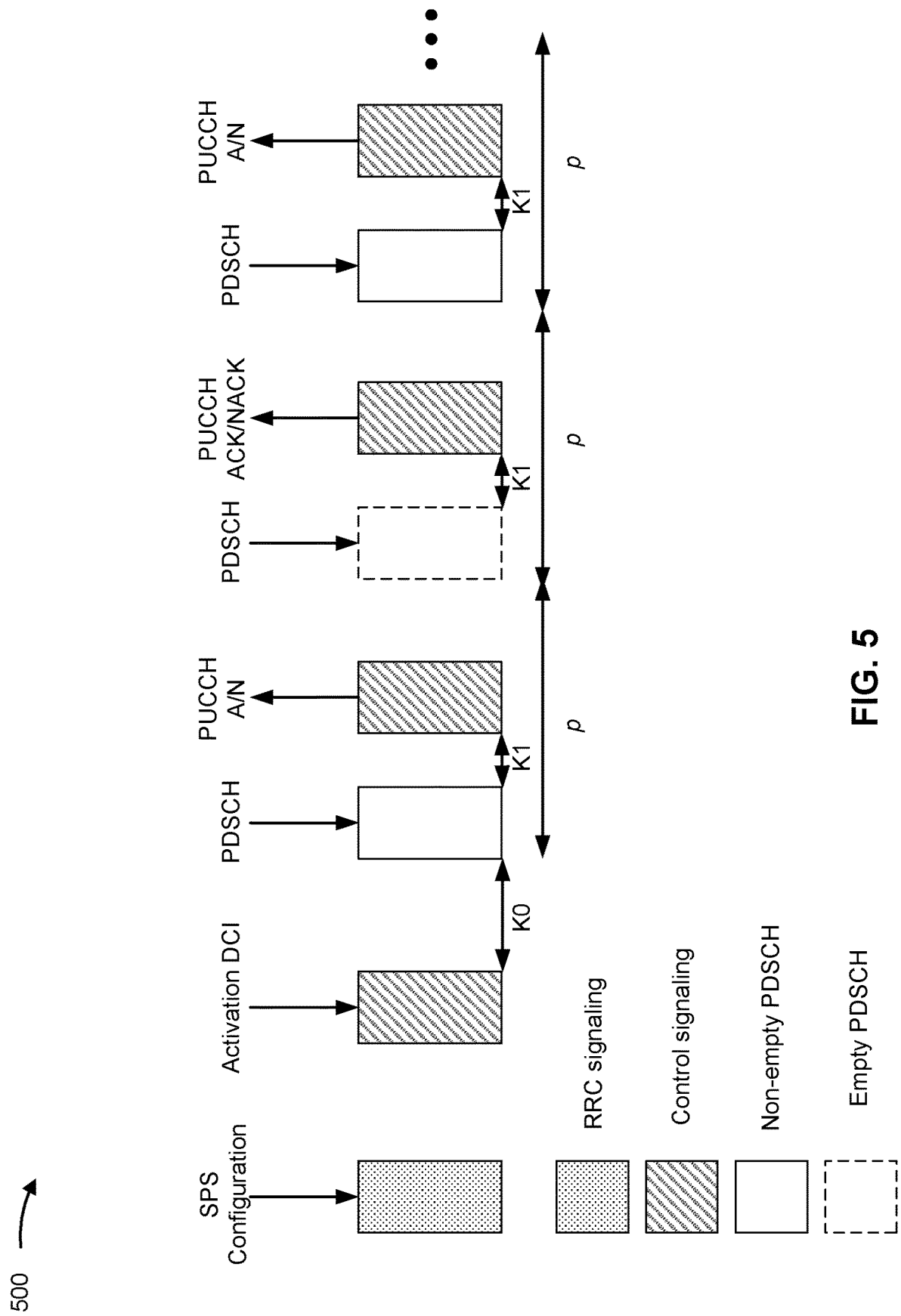
FIG. 5 is a diagram illustrating an example of semi-persistent scheduling (SPS) configuration and communication, in accordance with the present disclosure.

FIG. 5 is a diagram illustrating an example 500 of semi-persistent scheduling (SPS) configuration and communication, in accordance with the present disclosure. FIG. 5 shows communication between a UE (e.g., the UE 120) and a base station (e.g., the base station 110). The communications are indicated by rectangles, and include configuration signaling (e.g., radio resource control (RRC) signaling), downlink control information (DCI), which may be conveyed via a physical downlink control channel (PDCCH) or a physical downlink shared channel (PDSCH), a PDSCH (which may be associated with an SPS occasion), and HARQ-ACK feedback which may be transmitted on a physical uplink control channel (PUCCH). The HARQ-ACK feedback is shown as "ACK/NACK." "ACK/NACK" may refer to acknowledgement (ACK) or negative acknowledgement (NACK), and may also be referred to herein as "A/N." A downward arrow associated with a communication indicates a downlink communication, and an upward arrow associated with a communication indicates an uplink communication.

As shown, the UE may receive an SPS configuration (e.g., via RRC signaling). The SPS configuration may indicate parameters for an SPS configuration of the UE. For example, the SPS configuration may indicate a periodicity (p), a first offset (K0) between activating DCI and a first SPS occasion of an SPS resource allocation, and/or a second offset (K1) between an SPS occasion and a corresponding reporting occasion, among other examples. In some aspects, K0, K1, and p may be defined in terms of a number of slots, though other definitions of K0, K1, and p may be used. For example, the SPS configuration may indicate a set of SPS occasions.

In some examples, the SPS RRC configuration may indicate an SPS resource allocation, which may be defined based at least in part on one or more of the above parameters and/or other parameters. In some aspects, the SPS RRC configuration may configure multiple SPS configurations, and activation DCI may activate one (or more) of the multiple SPS configurations. SPS may be used to schedule a set of downlink transmissions (referred to as an SPS communication), each downlink transmission corresponding to an SPS occasion of a set of SPS occasions, for the UE without requiring individual downlink grants (e.g., in DCI) for each downlink transmission, thereby conserving signaling overhead. For example, an SPS configuration may indicate a set of resources for the set of SPS occasions, such as time resources (e.g., according to a configured periodicity and/or time offset), frequency resources, and/or physical resource blocks (PRBs), among other examples. Additionally, or alternatively, the SPS configuration may indicate a set of transmission parameters for the set of SPS occasions, such as a modulation and coding scheme (MCS), a resource allocation, a transport block (TB) size, a beam, and/or a transmission configuration indication (TCI) state, among other examples. SPS may be useful when the UE is associated with periodic and/or deterministic traffic. For example, the UE may be associated with traffic that arrives at the UE in a periodic and/or in a predictable manner. Therefore, SPS may be used to configure the set of SPS occasions (e.g., for the periodic traffic) to enable the UE to receive multiple downlink transmissions, without requiring individual downlink grants (e.g., in DCI) for each downlink transmission. For example, SPS may be used for voice traffic (e.g., voice over Internet Protocol (VoIP)), video traffic, streaming traffic, and/or gaming traffic, among other examples.

As shown, the UE may receive an activation DCI. "Activation DCI" may refer to a DCI configured to activate an SPS resource allocation. For example, the activation DCI may cause the UE to begin monitoring SPS occasions of the SPS resource allocation. The UE may monitor SPS occasions starting after the first offset K0 has elapsed, and may monitor SPS occasions in accordance with the periodicity p. The UE may report HARQ-ACK feedback regarding the SPS occasions in accordance with the second offset K1. The activation DCI may indicate one or more parameters for the activated SPS configuration, such as a modulation and coding scheme (MCS), a resource block (RB) allocation, and/or one or more antenna ports for SPS transmission, among other examples.

As shown by the dashed outline of the second SPS occasion, some SPS occasions may be empty, also referred to herein as being skipped. An empty SPS occasion (also known as a skipped SPS occasion) is a set of resources, included in an SPS resource allocation, that are not used by a base station for a transmission. The base station can determine that an SPS occasion is to be empty based at least in part on a variety of factors. For example, some SPS occasions may be configured for retransmission of prior failed transmissions and, if prior transmissions are successful, the SPS occasions may include no data. An SPS occasion that is not empty or is not skipped (e.g., that includes a PDSCH carrying data directed to a UE) is referred to herein as a non-empty SPS occasion or a non-skipped SPS occasion.

As shown, after each SPS occasion, the UE may transmit HARQ-ACK feedback regarding a result of monitoring the SPS occasion. The UE may transmit an ACK if the UE successfully decoded a communication in the SPS occasion or may transmit a NACK if the UE failed to decode a communication in the SPS occasion. For example, the UE may transmit a NACK for an empty SPS occasion and for a non-empty SPS occasion in which the UE failed to decode a communication. In some deployments, the UE may transmit HARQ-ACK feedback regarding multiple SPS occasions in a single uplink grant, such as after the multiple SPS occasions have occurred.

As indicated above, FIG. 5 is provided as an example. Other examples may differ from what is described with respect to FIG. 5.

Figure 6:
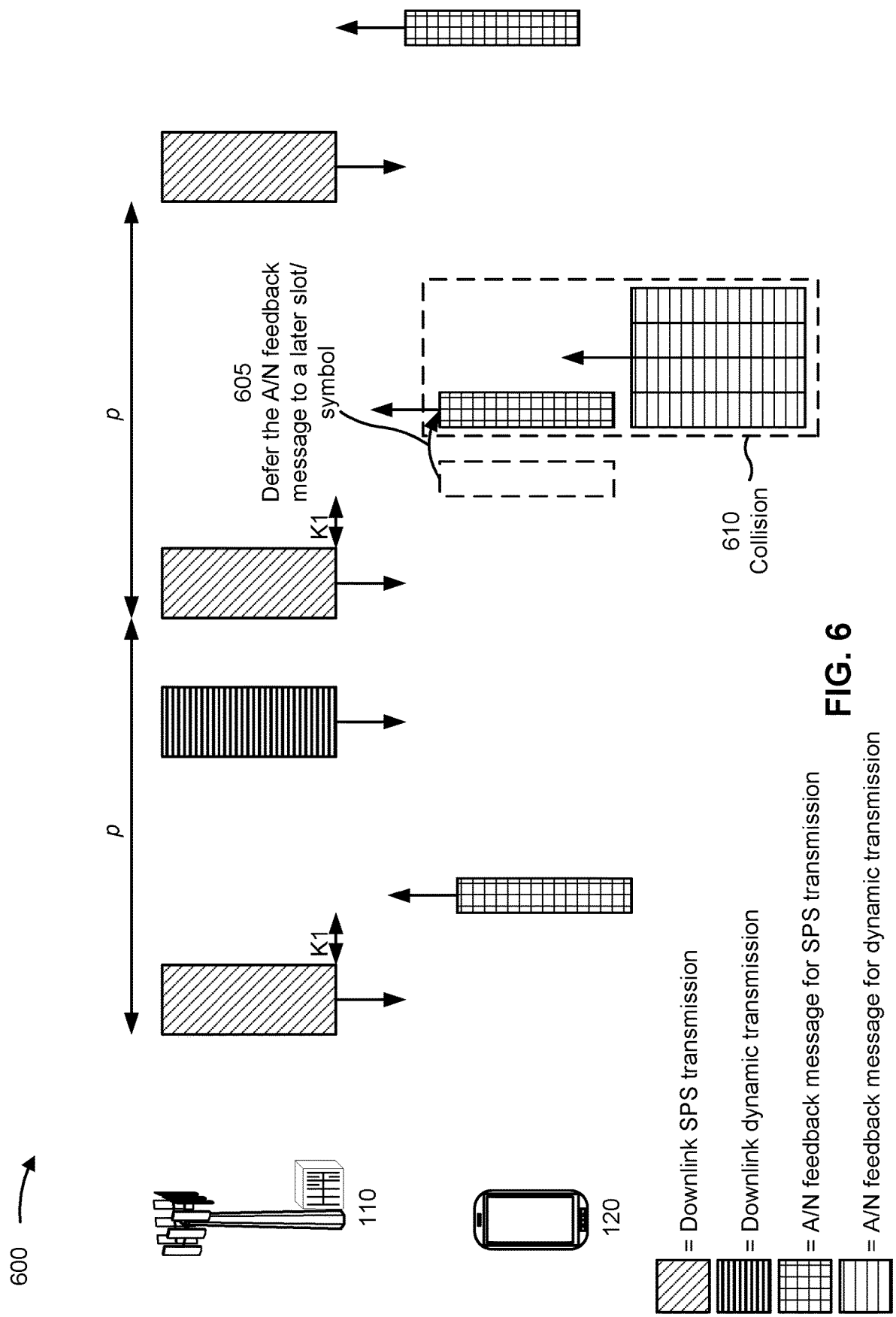
FIG. 6 is a diagram illustrating an example of feedback message collisions, in accordance with the present disclosure.

FIG. 6 is a diagram illustrating an example 600 of feedback message collisions, in accordance with the present disclosure. FIG. 6 shows communication between a UE (e.g., the UE 120) and a network entity (e.g., depicted and described as the base station 110 in FIG. 6 as an example). The communications are indicated by rectangles, and SPS transmissions (e.g., downlink SPS transmissions), dynamic transmissions (e.g., downlink dynamic transmissions), and feedback messages (e.g., A/N feedback messages). "Dynamic transmission" may refer to a downlink transmission that is scheduled by the base station 110 using an explicit downlink grant (e.g., in DCI). For example, dynamic transmissions may be associated with an explicit downlink grant for each downlink transmission, whereas SPS transmissions may not be associated with an explicit downlink grant for each SPS transmission (e.g., as explained in more detail in connection with FIG. 5). A downward arrow associated with a communication indicates a downlink communication, and an upward arrow associated with a communication indicates an uplink communication.

As described elsewhere herein, the UE 120 may transmit A/N feedback to the base station 110 for SPS transmissions. For example, the UE 120 may transmit an A/N feedback message associated with an SPS occasions after an amount of time after the SPS occasion as indicated by an offset value, K1 (e.g., the offset value K1 may be configured in the SPS configuration, as described elsewhere herein). An A/N feedback message associated with an SPS occasion may be referred to herein as an "SPS A/N feedback message." In some examples, when the base station 110 schedules a dynamic transmission, the base station 110 may indicate a set of resources (e.g., time domain resources and/or frequency domain resources) to be used for transmitting an A/N feedback message associated with the dynamic transmission. For example, DCI that schedules the dynamic transmission may indicate a set of resources to be used by the UE 120 for transmitting an A/N feedback message associated with the dynamic transmission. A/N feedback messages associated with a dynamic transmission may be referred to herein as a "dynamic A/N feedback message."

As shown by reference number 605, in some cases, the UE 120 may defer an SPS A/N feedback message to a later slot and/or symbol. For example, in some cases, an SPS A/N feedback message may be scheduled to occur during a downlink slot, during downlink symbols, and/or during a downlink portion of a special slot. For example, in accordance with a TDD configuration and/or a slot type pattern configured by the base station 110, the SPS A/N feedback message as originally scheduled (shown by the dashed rectangle in FIG. 6) may occur during a downlink slot, during one or more downlink symbols, and/or during a downlink portion of a special slot. Because the SPS A/N feedback message is an uplink message, the UE 120 may not be permitted to transmit the SPS A/N feedback message during the downlink slot, during downlink symbols, and/or during the downlink portion of a special slot. In some cases, the UE 120 may simply refrain from transmitting the SPS A/N feedback message and/or may not attempt to transmit the SPS A/N feedback message. However, this may result in the SPS A/N feedback message being lost, resulting in the base station 110 not receiving an indication of whether the corresponding SPS transmission was successfully received and/or decoded by the UE 120. Therefore, as shown by reference number 605, the UE 120 may delay a transmission of the SPS A/N feedback message to a later (e.g., future) slot and/or symbol. In other words, the UE 120 may defer the SPS A/N feedback message to a second set of resources that occur later than the originally scheduled set of resources for the SPS A/N feedback message. For example, the UE 120 may delay a transmission of the SPS A/N feedback message to a next available uplink slot (e.g., in accordance with a TDD configuration and/or a slot type pattern configured by the base station 110). An SPS A/N feedback message that is deferred and/or delayed as described above may be referred to herein as a "deferred SPS A/N feedback message" or a "delayed SPS A/N feedback message."

In some cases, as shown by reference number 610, a collision may occur between a deferred SPS A/N feedback message and a dynamic A/N feedback message. As used herein, "collision" may refer to on occasion where a first set of resources associated with a first message at least partially overlaps in the time domain with a second set of resources associated with a second message and/or are scheduled to occur in the same slot. For example, as shown in FIG. 6, a first set of resources (e.g., time domain resources and/or frequency domain resources) associated with the deferred SPS A/N feedback message may at least partially overlap in the time domain with a second set of resources associated with the dynamic A/N feedback message. As shown in FIG. 6, the dynamic A/N feedback message may be associated with one or more repetitions (e.g., 4 total repetitions as shown in FIG. 6). As another example, a UE may only be capable of (e.g., due to a UE capability and/or a rule defined by a wireless communication standard) transmitting a single feedback message (e.g., a single SPS A/N feedback message) in a single slot. Therefore, where multiple SPS A/N feedback messages are to be transmitted in the same slot, a collision may occur (e.g., because the UE may be unable to transmit all of the multiple SPS A/N feedback messages). As used herein, "repetition" may refer to the initial communication and also to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. For example, each repetition may carry the same, or substantially the same information (e.g., the A/N feedback associated with the dynamic transmission in the example 600 depicted in FIG. 6). In other examples, the dynamic A/N feedback message may not be associated with any repetitions (e.g., the dynamic A/N feedback message may be a single transmission).

In some cases, the UE 120 may be unable to transmit multiple transmissions at the same time. For example, if multiple transmissions are scheduled at the same time and on the same carrier (e.g., on the same component carrier), then the UE 120 may be unable to transmit the multiple transmissions (e.g., due to hardware restrictions of the UE 120 and/or due to network restrictions). For example, because of the collision shown by reference number 610, the UE 120 may be unable to transmit one of, or both, the deferred SPS A/N feedback message and the dynamic A/N feedback message (e.g., one or more, or all, repetitions of the dynamic A/N feedback message). This may result in the feedback associated with the deferred SPS A/N feedback message and/or the dynamic A/N feedback message not being transmitted to the base station 110. Failing to transmit A/N feedback may increase latency, decrease performance, and/or decrease efficiency, among other examples, of communications between the UE 120 and the base station 110.

Some techniques and apparatuses described herein enable collision resolution for A/N feedback messages. For example, some techniques and apparatuses described herein may enable a UE 120 to mitigate a collision between a deferred SPS A/N feedback message and a dynamic A/N feedback message. For example, the UE 120 may perform an action to mitigate the collision. In some aspects, the action may be based at least in part on a condition associated with the collision. For example, in some aspects the action may be based at least in part on whether the dynamic A/N feedback message is associated with repetitions (e.g., is to be transmitted with one or more repetitions). For example, the UE 120 may perform different actions if the dynamic A/N feedback message is associated with repetitions than if the dynamic A/N feedback message is not associated with repetitions. In some aspects, the action may be based at least in part on whether any repetitions of the dynamic A/N feedback message have occurred (e.g., have been transmitted) prior to a set of resources associated with the deferred SPS A/N feedback message (e.g., in the time domain). In some aspects, the action may be based at least in part on a first priority associated with the deferred SPS A/N feedback message and a second priority associated with the dynamic A/N feedback message (e.g., the action may be different depending on which feedback message is associated with a higher priority).

As a result, the UE 120 may be enabled to resolve collisions among deferred SPS A/N feedback messages and dynamic A/N feedback messages. This may enable the UE 120 to transmit information (e.g., ACK or NACK feedback) for at least one (or both) of a SPS A/N feedback message and a dynamic A/N feedback message associated with a collision. Additionally, the collision resolution described herein may enable the UE 120 to ensure that information (e.g., ACK or NACK feedback) for a higher priority A/N feedback message associated with a collision is transmitted by the UE 120. As a result, the UE 120 may be enabled to provide ACK or NACK feedback to the base station 110 even when there is a collision among a deferred SPS A/N feedback message and a dynamic A/N feedback message. Transmitting the feedback message(s) based at least in part on resolving the collision as described herein may decrease latency, improve performance, and/or improve efficiency, among other examples, of communications between the UE 120 and the base station 110.

In some aspects, the action may include multiplexing the deferred SPS A/N feedback message with the dynamic A/N feedback message. For example, the UE 120 may combine and/or multiplex the deferred SPS A/N feedback message with the dynamic A/N feedback message based at least in part on a codebook associated with the dynamic A/N feedback message. The UE 120 may transmit the multiplexed message (e.g., including the dynamic A/N feedback message and the deferred SPS A/N feedback message) using resource(s) associated with the dynamic A/N feedback message. In some aspects, the action may include refraining from transmitting (e.g., dropping) one of the deferred SPS A/N feedback message or the dynamic A/N feedback message and transmitting the other A/N feedback message. In some aspects, where the dynamic A/N feedback message is associated with a set of repetitions and where the deferred SPS A/N feedback message is to be transmitted (e.g., based at least in part on the action), the UE 120 may refrain from transmitting one or more repetitions of the dynamic A/N feedback message that collides with the deferred SPS A/N feedback message. The UE 120 may transmit one or more repetitions of the dynamic A/N feedback message that do collide with the deferred SPS A/N feedback message. Other examples of actions that may be performed by the UE 120 and/or by the base station 110 to resolve or mitigate the collision are described in more detail elsewhere herein.

As indicated above, FIG. 6 is provided as an example. Other examples may differ from what is described with respect to FIG. 6.

Figure 7:
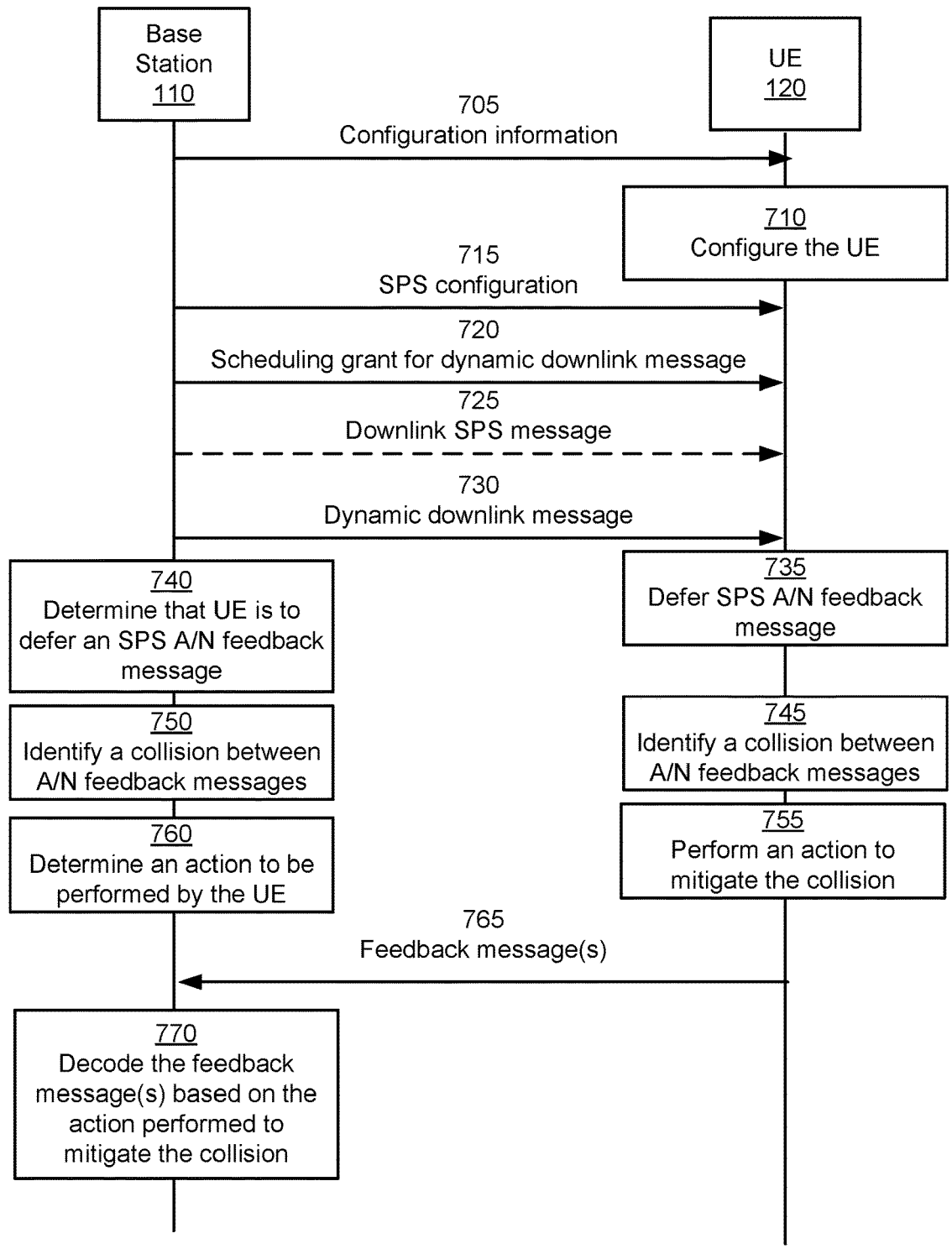
FIG. 7 is a diagram illustrating an example associated with collision resolution for acknowledgement (ACK) or negative acknowledgement (NACK) feedback messages, in accordance with the present disclosure.

FIG. 7 is a diagram illustrating an example 700 associated with collision resolution for ACK or NACK (A/N) feedback messages, in accordance with the present disclosure. As shown in FIG. 7, a network entity (e.g., depicted and described in FIG. 7 as the base station 110 as an example) and a UE 120 may communicate with one another in a wireless network, such as the wireless network 100.

As shown by reference number 705, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or MAC signaling (e.g., MAC control elements (MAC-CEs)). In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate that collision resolution handling for collisions between A/N feedback messages (e.g., as described herein) is to be applied by the UE 120. For example, the configuration information may indicate that the UE 120 is to apply collision handling (e.g., as described herein) when the UE 120 detects a collision between A/N feedback messages. In some aspects, the configuration information may indicate that the UE 120 is to apply collision handling based at least in part on detecting a collision between a deferred SPS A/N feedback message and a dynamic A/N feedback message. The configuration information may indicate that the UE 120 is to perform one or more actions described herein to resolve or mitigate collisions between A/N feedback messages.

For example, the configuration information may indicate that one of the A/N feedback messages associated with the collision is to be transmitted by the UE 120 and that all other A/N feedback messages associated with the collision are not to be transmitted. In some aspects, the configuration information may indicate that the UE 120 is multiplex, append, merge, and/or combine the A/N feedback messages associated with the collision into a single message.

In some aspects, the configuration information may indicate one or more SPS configurations. An SPS configuration may indicate parameters for an SPS configuration of the UE 120. For example, the SPS configuration may indicate a periodicity (p), a first offset (K0) between activating DCI (or MAC-CE) and a first SPS occasion of an SPS resource allocation, and/or a second offset (K1) between an SPS occasion and a corresponding reporting occasion (for transmitting feedback information associated with the SPS occasion), among other examples. In some aspects, K0, K1, and p may be defined in terms of a number of slots, though other definitions of K0, K1, and p may be used. An SPS configuration may indicate a set of SPS occasions (e.g., time domain resources and/or frequency domain resources that may be associated with an SPS transmission). In some aspects, the configuration information may indicate that the UE 120 is to delay or defer SPS A/N feedback messages if the UE 120 is unable to transmit the SPS A/N feedback message using resources indicates by the SPS configuration (e.g., in a similar manner as described in more detail elsewhere herein).

As shown by reference number 710, the UE 120 may configure the UE 120 for communicating with the base station 110. In some aspects, the UE 120 may configure the UE 120 based at least in part on the configuration information. In some aspects, the UE 120 may be configured to perform one or more operations described herein.

In some aspects, the UE 120 may transmit, and the base station 110 may receive, an indication of a capability of the UE 120 to support collision resolution handling for collisions between A/N feedback messages, as described herein. For example, the UE 120 may transmit capability information indicating whether the UE 120 is capable of performing collision resolution handling for collisions between A/N feedback messages, as described herein. In some aspects, the UE 120 may transmit the indication of the capability via RRC signaling, one or more MAC-CEs, and/or a PUCCH message, among other examples. In some aspects, the base station 110 may determine the configuration information based at least in part on the indication of the capability transmitted by the UE 120.

As shown by reference number 715, the base station 110 may transmit, and the UE 120 may receive, an SPS configuration. As described above, the SPS configuration may be indicated via the configuration information. In some aspects, the SPS configuration may be indicated via a different message. The SPS configuration may configure SPS occasions and reporting occasions (for reporting A/N feedback) associated with the reporting occasions (e.g., in a similar manner as described in more detail elsewhere herein). For example, the base station 110 may transmit, and the UE 120 may receive, an indication of a first set of resources (e.g., time domain resources and/or frequency domain resources) associated with an SPS A/N feedback message.

As shown by reference number 720, the base station 110 may transmit, and the UE 120 may receive, a scheduling grant associated with a dynamic downlink message. For example, the base station 110 may transmit, and the UE 120 may receive, DCI that schedules the dynamic downlink message. The DCI may indicate resources (e.g., time domain resources and/or frequency domain resources) associated with the dynamic downlink message. Additionally, the DCI may indicate resources (e.g., time domain resources and/or frequency domain resources) to be used by the UE 120 to transmit feedback information (e.g., ACK feedback or NACK feedback) associated with the downlink message. For example, the base station 110 may transmit, and the UE 120 may receive, an indication of a set of resources (e.g., time domain resources and/or frequency domain resources) associated with a dynamic A/N feedback message.

For example, the scheduling grant may include an uplink grant to be used to transmit the dynamic A/N feedback message. The uplink grant may indicate the set of resources (e.g., time domain resources and/or frequency domain resources) associated with the dynamic A/N feedback message. In some aspects, as described in more detail elsewhere herein, a size of the uplink grant (e.g., a quantity of time domain resources and/or a quantity of frequency domain resources) to be used to transmit the dynamic A/N feedback message may be based at least in part on an action to be performed by the UE 120 to resolve a collision associated with the dynamic A/N feedback message. For example, in some cases, the action may include multiplexing or appending another A/N feedback message (e.g., an SPS A/N feedback message) with the dynamic A/N feedback message to form a single message that includes multiple A/N feedback indications. In such examples, the size of the single multiplexed or appended message may be larger than a size of the dynamic A/N feedback message. Therefore, the base station 110 may determine that a size of the uplink grant to be used to transmit the dynamic A/N feedback message should be larger (e.g., because the uplink grant will be used to transmit a multiplexed message or appended message that includes multiple A/N feedback indications, rather than being used only to transmit the dynamic A/N feedback message).

In some aspects, the scheduling grant associated with the dynamic downlink message may indicate whether the dynamic A/N feedback message is to be transmitted with repetitions. For example, as described elsewhere herein, in some cases the UE 120 may be scheduled to transmit multiple repetitions of a dynamic A/N feedback message to improve the reliability of the dynamic A/N feedback message. In some aspects, the scheduling grant associated with the dynamic downlink message may indicate whether the dynamic A/N feedback message is to be transmitted as a single transmission (e.g., without repetitions) or as multiple repeated transmissions (e.g., with repetitions). In some aspects, the configuration information may indicate whether the dynamic A/N feedback message is to be transmitted with repetitions (e.g., rather than the scheduling grant). In some other aspects, another message (such as a MAC-CE message) may indicate whether the dynamic A/N feedback message is to be transmitted with repetitions. For example, if the dynamic A/N feedback message is to be transmitted with repetitions, the base station 110 may indicate a quantity of repetitions and/or a set of resources (e.g., time domain resources and/or frequency domain resources) associated with each repetition.

In some aspects, the base station 110 may transmit, and the UE 120 may receive, an indication of a first priority associated with the SPS A/N feedback message and a second priority associated with the dynamic A/N feedback message. For example, the base station 110 may transmit the indication of the first priority associated with the SPS A/N feedback message via the configuration information and/or the SPS configuration. The base station 110 may transmit the indication of the second priority associated with the dynamic A/N feedback message via the scheduling grant. In some aspects, the first priority associated with the SPS A/N feedback message may be based at least in part on a priority of the SPS occasion associated with the SPS A/N feedback message and/or traffic to be transmitted using the SPS occasion. Similarly, the second priority associated with the dynamic A/N feedback message may be based at least in part on a priority of a downlink message associated with the dynamic A/N feedback message. For example, the first priority and/or the second priority may be based at least in part on a type of traffic transmitted in a downlink message to the UE 120. For example, the first priority may be based at least in part on a type of traffic or a quality of service (QoS) flow associated with the SPS occasion corresponding to the SPS A/N feedback message. Similarly, the second priority may be based at least in part on a type of traffic or a QoS flow associated with the dynamic downlink message associated with the dynamic A/N feedback message. The first priority and/or the second priority may be priority levels and/or priority values. A higher priority level or priority value may indicate a higher priority transmission.

For example, ultra-reliable low latency communication (URLLC) traffic may have a higher priority than enhanced mobile broadband (eMBB) traffic. In some aspects, the UE 120 may implicitly determine a priority level of a downlink message or SPS occasion based at least in part on a traffic type. For example, the configuration information (e.g., an RRC configuration or another configuration) may indicate priority levels associated with different traffic types. The UE 120 may identify a priority level of downlink message or SPS occasion based at least in part on a traffic type and the configuration information. For example, the priority of an A/N feedback messages may be the same as, or may be based at least in part on, the priority of a corresponding downlink message or SPS occasion.

As shown by reference number 725, the base station 110 may transmit, and the UE 120 may receive, a downlink SPS message. For example, the base station 110 may transmit the downlink SPS message in accordance with the SPS configuration. The base station 110 may transmit the downlink SPS message in an SPS occasion configured by the SPS configuration. The UE 120 may receive the downlink SPS message and may attempt to decode the downlink SPS message. The UE 120 may determine if the downlink SPS message has been successfully received based at least in part on attempting to decode the downlink SPS message. Alternatively, the base station 110 may not transmit a message during the SPS occasion (e.g., the SPS occasion may be an empty SPS occasion). The UE 120 may monitor the SPS occasion (e.g., may monitor the time domain resources and/or the frequency domain resources) and may not detect any downlink messages associated with the SPS occasion. The UE 120 may determine feedback information associated with the SPS occasion based at least in part on monitoring the SPS occasion and/or decoding the downlink SPS message received in the SPS occasion. For example, if the UE 120 successfully receives and/or decodes the downlink SPS message, then the UE 120 may determine that the feedback information is ACK feedback. If the UE 120 does not successfully decode the downlink SPS message or if the UE 120 does not detect a message associated with the SPS occasion, then the UE 120 may determine that the feedback information is NACK feedback.

As shown by reference number 730, the base station 110 may transmit, and the UE 120 may receive, the dynamic downlink message (e.g., that is scheduled by the scheduling grant). For example, the dynamic downlink message may be transmitted using a shared channel or a data channel (e.g., the PDSCH). The UE 120 may receive the dynamic downlink message and may attempt to decode the dynamic downlink message. The UE 120 may determine feedback information associated with the dynamic downlink message based at least in part on attempting to decode the dynamic downlink message. For example, if the UE 120 successfully receives and/or decodes the dynamic downlink message, then the UE 120 may determine that the feedback information is ACK feedback. If the UE 120 does not successfully receive and/or decode the dynamic downlink message, then the UE 120 may determine that the feedback information is NACK feedback.

As shown by reference number 735, the UE 120 may defer the SPS A/N feedback message associated with the SPS occasion. For example, as described above, the SPS configuration may indicate a first set of resources to be used by the UE 120 to transmit the SPS A/N feedback message associated with the SPS occasion. However, the UE 120 may be unable to transmit the SPS A/N feedback message using the first set of resources. For example, the first set of resources may be associated with a downlink slot or a portion of a special slot that is associated with downlink transmissions. In some other aspects, another condition may prevent the UE 120 from transmitting the SPS A/N feedback message using the first set of resources. Therefore, the UE 120 may defer or delay the SPS A/N feedback message to a second set of resources (e.g., a second set of time domain resources and/or frequency domain resources). For example, the UE 120 may defer or delay the SPS A/N feedback message to a next available uplink transmission occasion (e.g., a next uplink slot or a next uplink portion of a special slot). This may improve the efficiency and reliability of the SPS A/N feedback message because the UE 120 is enabled to transmit the SPS A/N feedback message even when a condition exists that prevents the UE 120 from transmitting the SPS A/N feedback message using a set of resources indicated by the SPS configuration.

As shown by reference number 740, the base station 110 may determine that the UE 120 is to defer the SPS A/N feedback message. The base station 110 may determine that a condition exists that prevents the UE 120 from transmitting the SPS A/N feedback message using a set of resources indicated by the SPS configuration. For example, the base station 110 may configure a slot type pattern or a TDD pattern. Therefore, the base station 110 may identify that the set of resources indicated by the SPS configuration to be used for the SPS A/N feedback message occur during a downlink slot or a downlink portion of a special slot. The base station 110 may determine that the UE 120 is to defer or delay a transmission of the SPS A/N feedback message to a next available uplink transmission occasion. The base station 110 may identify a second set of resources (e.g., a second set of time domain resources and/or frequency domain resources) to which the SPS A/N feedback message is deferred (e.g., a second set of resources that are to be used by the UE 120 to transmit the SPS A/N feedback message).

As shown by reference number 745, the UE 120 may identify or detect a collision between A/N feedback messages. For example, the UE 120 may detect a collision between the deferred SPS A/N feedback message and the dynamic A/N feedback message. The UE 120 may detect that the second set of resources associated with the SPS A/N feedback message (e.g., the set of resources that the SPS A/N feedback message was deferred to) and a third set of resources (e.g., associated with the dynamic A/N feedback message) at least partially overlap in the time domain. As another example, the UE 120 may identify or detect that the second set of resources associated with the SPS A/N feedback message and the third set of resources are included in the same slot. As shown by reference number 750, the base station 110 may identify or detect the collision between A/N feedback messages in a similar manner.

As shown by reference number 755, the UE 120 may perform an action to mitigate or resolve the collision between the A/N feedback messages. For example, the UE 120 may perform an action based at least in part on the second set of resources and the third set of resources at least partially overlapping in the time domain or being included in the same slot. For example, the UE 120 may be unable to transmit multiple messages at the same time (e.g., because the multiple messages are to be transmitted on the same component carrier, the same carrier frequency band, and/or to the same cell or base station 110). Therefore, the UE 120 may perform an action to mitigate or resolve the collision to ensure that at least one of the A/N feedback messages is transmitted.

In some aspects, the action may be indicated by the configuration information. In some aspects, the action may be indicated by the base station 110 in another message. In some aspects, the action may be defined, or otherwise fixed, by a wireless communication standard, such as the 3GPP. The action may be based at least in part on a condition associated with the collision. For example, the condition may include whether the dynamic A/N feedback message is to be transmitted with one or more repetitions. As another example, the condition may include whether any repetitions of the dynamic A/N feedback message are scheduled to occur (e.g., scheduled to be transmitted by the UE 120) before the second set of resources (e.g., to be used to transmit the deferred SPS A/N feedback message) in the time domain. In some aspects, the condition may include whether the deferred SPS A/N message or the dynamic A/N message is associated with a higher priority. For example, the UE 120 may perform different actions for collisions associated with different conditions, as described in more detail herein.

For example, in some cases, the dynamic A/N feedback message may not be associated with repetitions. For example, the dynamic A/N feedback message may be scheduled to be transmitted in a single transmission. If the dynamic A/N feedback message is to be transmitted without repetitions, then the action may include multiplexing the dynamic A/N feedback message with the SPS A/N feedback message. For example, the UE 120 may merge, append, and/or combine the dynamic A/N feedback message with the SPS A/N feedback message. For example, the UE 120 may append the SPS A/N feedback message onto the dynamic A/N feedback message. The UE 120 may multiplex the SPS A/N feedback message with the dynamic A/N feedback message based at least in part on a codebook associated with the dynamic A/N feedback message. For example, the UE 120 may use the codebook associated with the dynamic A/N feedback message to multiplex the SPS A/N feedback message with the dynamic A/N feedback message. "Codebook" may refer to a matrix to transform data information (e.g., data bits or PDSCH bits) to another set of data that maps to an antenna port of the UE 120. In some aspects, the codebook may be a set of precoders (e.g., a precoding matrix). A codebook may provide information for precoding for MIMO and/or for beamforming. For example, the UE 120 may combine information (e.g., bits) associated with the dynamic A/N feedback message and with the SPS A/N feedback message to form a multiplexed (e.g., appended) A/N feedback message (e.g., including information for the dynamic A/N feedback message and the SPS A/N feedback message). The UE 120 may perform precoding for the multiplexed A/N feedback message using the codebook associated with the dynamic A/N feedback message (e.g., to enable the UE 120 to transmit the multiplexed A/N feedback message using the set of resources associated with the dynamic A/N feedback message).

In some aspects, the UE 120 may compress the information (e.g., the bits) associated with the SPS A/N feedback message prior to multiplexing or appending the SPS A/N feedback message with the dynamic A/N feedback message. For example, in some aspects, the SPS A/N feedback message may include additional information beyond an ACK or NACK indication (e.g., which may be 1 bit in size). Therefore, in some aspects, the SPS A/N feedback message may have a size larger than 1 bit. In some aspects, the UE 120 may compress the SPS A/N feedback message (e.g., to a size of 1 bit) prior to multiplexing or appending the SPS A/N feedback message with the dynamic A/N feedback message. For example, if a first priority associated with the SPS A/N feedback message is lower than a second priority associated with the dynamic A/N feedback message, then the UE 120 may compress the SPS A/N feedback message prior to multiplexing or appending. If the first priority associated with the SPS A/N feedback message is a same priority as or a higher priority than the second priority associated with the dynamic A/N feedback message, then the UE 120 may multiplex or append the SPS A/N feedback message with the dynamic A/N feedback message without compressing the SPS A/N feedback message.

In other words, the UE 120 may compare the first priority associated with the SPS A/N feedback message to the second priority associated with the dynamic A/N feedback message to determine whether to compress (e.g., to reduce a size) of the SPS A/N feedback message prior to multiplexing or appending. The UE 120 may compress the SPS A/N feedback message using uplink data compression. In some aspects, the UE 120 may compress the SPS A/N feedback message using an AND operation. In some aspects, the UE 120 may compress the SPS A/N feedback message based at least in part on a compression protocol or compression technique, such as robust header compression (RoHC), Ethernet header compression (EHC), and/or uplink data compression, among other examples. As described elsewhere herein, the first priority and the second priority may be indicated by the base station 110 (e.g., in the SPS configuration, in the scheduling grant, in the downlink SPS message, and/or in the dynamic downlink message).

In some aspects, the dynamic A/N feedback message may be transmitted with one or more repetitions. In such examples, the action may be based at least in part on whether the any repetitions of the dynamic A/N feedback message are scheduled to occur (e.g., scheduled to be transmitted by the UE 120) before the second set of resources (e.g., to be used to transmit the deferred SPS A/N feedback message) in the time domain. If no repetitions are scheduled to occur before the second set of resources (e.g., to be used to transmit the deferred SPS A/N feedback message), then the UE 120 may multiplex (e.g., append) the SPS A/N feedback message with the repetitions of the dynamic A/N feedback message, in a similar manner as described above (e.g., with or without compressing the SPS A/N feedback message as described above). In some aspects, multiplexing (e.g., appending) the SPS A/N feedback message with the repetitions of the dynamic A/N feedback message may be based at least in part on the second set of resources (e.g., to be used to transmit the deferred SPS A/N feedback message) and a first repetition associated with the dynamic A/N feedback message being scheduled to occur at the same time or substantially the same time.

If the UE 120 multiplexes or appends the SPS A/N feedback message with a repetition of the dynamic A/N feedback message, then the UE 120 may multiplex or append the SPS A/N feedback message with each repetition of the dynamic A/N feedback message in a similar manner. In other words, the UE 120 may multiplex, across all repetitions of the dynamic A/N feedback message, the SPS A/N feedback message with the dynamic A/N feedback message. As a result, each repetition of the dynamic A/N feedback message may be the same size and/or carry the same information (e.g., the SPS A/N feedback and the dynamic A/N feedback). Ensuring that each repetition of the dynamic A/N feedback message is the same size and/or carries the same information may reduce a decoding complexity for the base station 110. For example, if different repetitions of the dynamic A/N feedback message were different sizes and/or carried different information, the base station 110 may be unable to decode the different repetitions.

In some aspects, if the dynamic A/N feedback message is to be transmitted (e.g., by the UE 120) with one or more repetitions, then the action may include refraining from transmitting one of the SPS A/N feedback message or the dynamic A/N feedback message based at least in part on the dynamic A/N feedback message being transmitted with one or more repetitions. In other words, in some cases, if the dynamic A/N feedback message is to be transmitted (e.g., by the UE 120) with one or more repetitions then the UE 120 may drop (e.g., not transmit) one of the SPS A/N feedback message or the dynamic A/N feedback message. In some aspects, the UE 120 may drop (e.g., not transmit) one of the SPS A/N feedback message or the dynamic A/N feedback message based at least in part on the at least one repetition of the dynamic A/N feedback message being scheduled to occur before the second set of resources associated with the SPS A/N feedback message in the time domain. In other words, if a transmission of the dynamic A/N feedback message (e.g., a transmission of a repetition of the dynamic A/N feedback message) is scheduled to occur before a transmission of the deferred SPS A/N feedback message, then the UE 120 may drop (e.g., not transmit) one of the deferred SPS A/N feedback message or the dynamic A/N feedback message. This is because multiplexing or appending the SPS A/N feedback message with the dynamic A/N feedback message after at least one repetition of the dynamic A/N feedback message has been transmitted may result in repetitions of the dynamic A/N feedback message having different sizes (e.g., different payload sizes), resulting in increased encoding complexity (e.g., at the UE 120) and decoding complexity (e.g., at the base station 110).

In some aspects, the UE 120 may determine whether to refrain from transmitting (e.g., to drop) the SPS A/N feedback message or the dynamic A/N feedback message based at least in part on comparing priorities of the SPS A/N feedback message and the dynamic A/N feedback message. For example, the UE 120 may refrain from transmitting the SPS A/N feedback message if the first priority associated with the SPS A/N feedback message is the same as or lower than the second priority associated with the dynamic A/N feedback message. Alternatively, the UE 120 may refrain from transmitting the dynamic A/N feedback message if the first priority associated with the SPS A/N feedback message is higher than the second priority associated with the dynamic A/N feedback message.

If the dynamic A/N feedback message is transmitted with one or more repetitions and the UE 120 determines that the action includes refraining from transmitting the dynamic A/N feedback message, then the UE 120 may refrain from transmitting repetitions that collides in the time domain with the SPS A/N feedback message. For example, the UE 120 may refrain from transmitting one or more repetitions of the dynamic A/N feedback message that collides in the time domain with the second set of resources associated with the SPS A/N feedback message. In other words, in such examples, the UE 120 may transmit any repetitions of the dynamic A/N feedback message that are associated with time domain resources that do not collide with time domain resources associated with the SPS A/N feedback message. This may improve a reliability of performance of the dynamic A/N feedback message while also ensuring that the SPS A/N feedback message (e.g., that may be associated with a higher priority) is also transmitted.

As shown by reference number 760, the base station 110 may determine an action to be performed by the UE 120 to mitigate or resolve the collision in a similar manner as described above. In some aspects, the base station 110 may perform an action that is based at least in part on the action to be performed by the UE 120 to mitigate or resolve the collision. For example, the base station 110 may schedule an uplink grant for the dynamic A/N feedback message based at least in part on determining whether the SPS A/N feedback message is to be multiplexed with the dynamic A/N feedback message. For example, the base station 110 may grant more resources or a larger size of resources for the dynamic A/N feedback message if the SPS A/N feedback message is to be multiplexed (e.g., appended) with the dynamic A/N feedback message (e.g., because the multiplexed or appended message will have a larger size than the dynamic A/N feedback message alone). For example, when transmitting the scheduling grant, a size of the set of resources associated with the dynamic A/N feedback message may be based at least in part on the second set of resources associated with the SPS A/N feedback message and the set of resources associated with the dynamic A/N feedback message colliding in the time domain (e.g., based at least in part on detecting the collision). For example, if the action to be performed by the UE 120 to mitigate or resolve the collision includes multiplexing (e.g., appending) the SPS A/N feedback message with the dynamic A/N feedback message, then the base station 110 may transmit an indication of an uplink grant (e.g., a set of resources) associated with the dynamic A/N feedback message (e.g., via the scheduled grant described above in connection with reference number 720) having a first size.

If the action to be performed by the UE 120 to mitigate or resolve the collision does not include multiplexing (e.g., appending) the SPS A/N feedback message with the dynamic A/N feedback message, then the base station 110 may transmit an indication of an uplink grant (e.g., a set of resources) associated with the dynamic A/N feedback message having a second size. The first size may be larger than the second size (e.g., the base station 110 may grant more time domain resources and/or frequency domain resources if the action to be performed by the UE 120 to mitigate or resolve the collision does not include multiplexing the SPS A/N feedback message with the dynamic A/N feedback message). In some aspects, the action to be performed by the base station 110 may include refraining from receiving one of the SPS A/N feedback or the dynamic A/N feedback message based at least in part on which A/N feedback message is dropped (e.g., not transmitted) by the UE 120. This may conserve resources that would have otherwise been used by the base station 110 to monitor for and/or to attempt to receive the A/N feedback message is dropped (e.g., not transmitted) by the UE 120.

As shown by reference number 765, the UE 120 may transmit, and the base station 110 may receive, at least one of the SPS A/N feedback message or the dynamic A/N feedback message based at least in part on performing the action. For example, the UE 120 may transmit, using the set of resources associated with the dynamic A/N feedback, the SPS A/N feedback and the dynamic A/N feedback in a single message based at least in part on multiplexing (e.g., appending) the SPS A/N feedback message with the dynamic A/N feedback message, as described above. In some aspects, such as when the dynamic A/N feedback message is to be transmitted with one or more repetitions, the UE 120 may transmit, across all repetitions of the dynamic A/N feedback message, the SPS A/N feedback message multiplexed with the dynamic A/N feedback message based at least in part on multiplexing the SPS A/N feedback message with the dynamic A/N feedback message, as described above.

In some aspects, such as when the action performed by the UE 120 include refraining from transmitting the SPS A/N feedback message, the UE 120 may transmit, using the set of resources associated with the dynamic A/N feedback message, the dynamic A/N feedback message. Alternatively, if the action to be performed by the UE 120 include refraining from transmitting the dynamic A/N feedback message, the UE 120 may transmit, using the set of resources associated with the SPS A/N feedback message (e.g., the second set of resources that the SPS A/N feedback message was deferred to), the SPS A/N feedback message. In some aspects, the UE 120 may transmit, using the second set of resources, the SPS A/N feedback message. The UE 120 may transmit any repetitions of the dynamic A/N feedback message that do not collide with the second set of resources associated with the SPS A/N feedback message.

As shown by reference number 770, the base station 110 may decode the A/N feedback message(s) transmitted by the UE 120 based at least in part on the action performed by the UE 120 to mitigate or resolve the collision. For example, the base station 110 may identify a size of an A/N feedback message based at least in part on the action performed by the UE 120 to mitigate or resolve the collision. For example, if the action includes multiplexing (e.g., appending) the SPS A/N feedback message with the dynamic A/N feedback message, the base station 110 may identify that the A/N feedback message transmitted by the UE 120 is to have a larger size and may decode the A/N feedback message accordingly. For example, the base station 110 may decode a multiplexed message based at least in part on identifying that the SPS A/N feedback message is to be multiplexed with the dynamic A/N feedback message. In some aspects, the base station 110 may decode each repetition of the dynamic A/N feedback message based at least in part on identifying that each repetition includes the SPS A/N feedback message multiplexed with the dynamic A/N feedback message. As a result, the base station 110 may be enabled to successfully decode and receive the SPS A/N feedback and/or the dynamic A/N feedback.

Therefore, the UE 120 may be enabled to resolve collisions among deferred SPS A/N feedback messages and dynamic A/N feedback messages. This may enable the UE 120 to transmit information (e.g., ACK or NACK feedback) for at least one (or both) of a SPS A/N feedback message and a dynamic A/N feedback message associated with a collision. Additionally, the collision resolution described herein may enable the UE 120 to ensure that information (e.g., ACK or NACK feedback) for a higher priority A/N feedback message associated with a collision is transmitted by the UE 120. As a result, the UE 120 may be enabled to provide ACK or NACK feedback to the base station 110 even when there is a collision among a deferred SPS A/N feedback message and a dynamic A/N feedback message. Transmitting the feedback message(s) based at least in part on resolving the collision as described herein may decrease latency, improve performance, and/or improve efficiency, among other examples, of communications between the UE 120 and the base station 110.

As indicated above, FIG. 7 is provided as an example. Other examples may differ from what is described with respect to FIG. 7.

Figure 8:
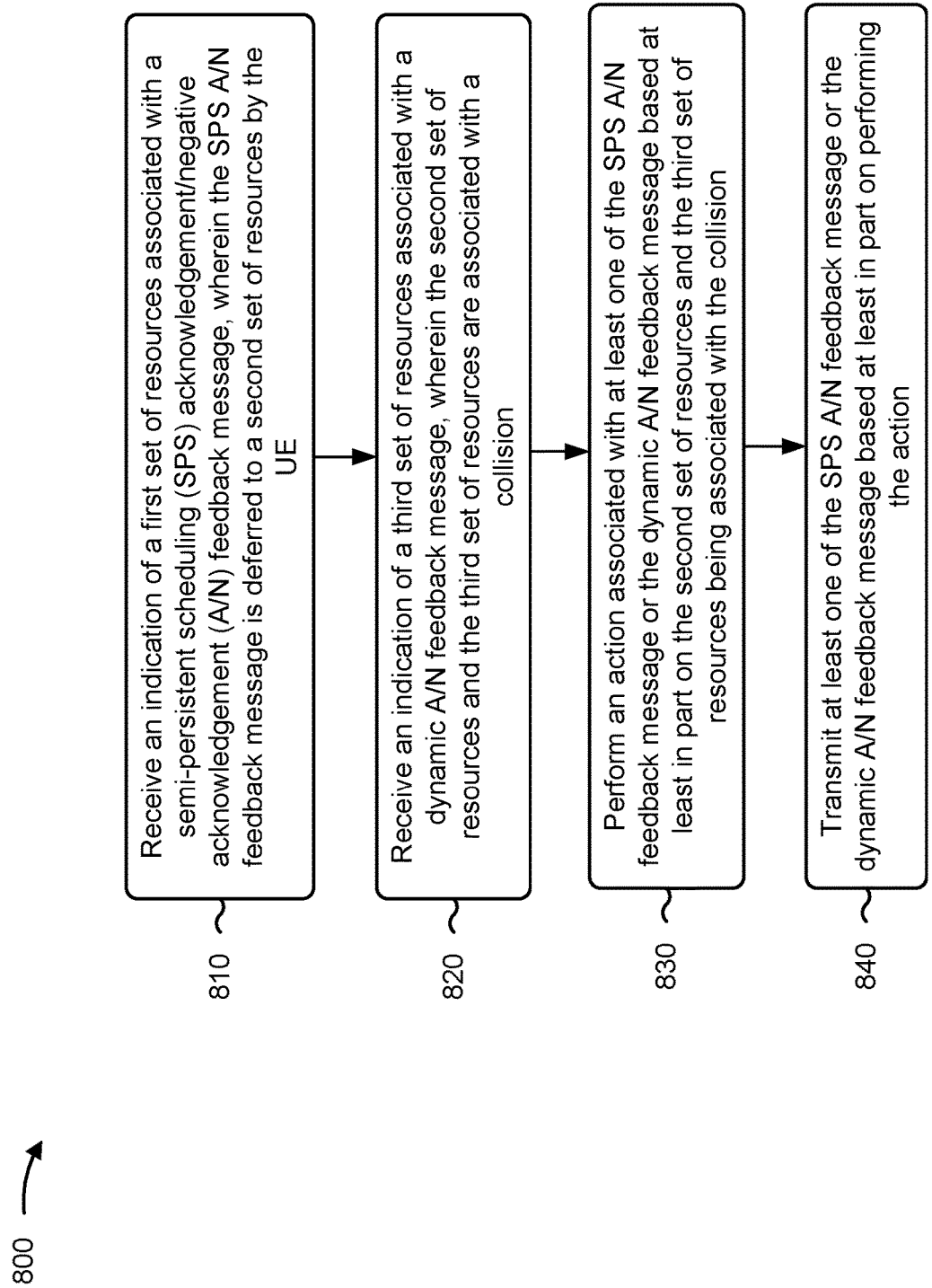
FIGS. 8 and 9 are diagrams illustrating example processes associated with collision resolution for ACK or NACK feedback messages, in accordance with the present disclosure.

FIG. 8 is a diagram illustrating an example process 800 performed, for example, by a UE, in accordance with the present disclosure. Example process 800 is an example where the UE (e.g., UE 120) performs operations associated with collision resolution for ACK or NACK feedback messages.

As shown in FIG. 8, in some aspects, process 800 may include receiving an indication of a first set of resources associated with an SPS A/N feedback message, wherein the SPS A/N feedback message is deferred to a second set of resources by the UE (block 810). For example, the UE (e.g., using communication manager 140 and/or reception component 1002, depicted in FIG. 10) may receive an indication of a first set of resources associated with an SPS A/N feedback message, wherein the SPS A/N feedback message is deferred to a second set of resources by the UE, as described above.

As further shown in FIG. 8, in some aspects, process 800 may include receiving an indication of a third set of resources associated with a dynamic A/N feedback message, wherein the second set of resources and the third set of resources are associated with a collision (block 820). For example, the UE (e.g., using communication manager 140 and/or reception component 1002, depicted in FIG. 10) may receive an indication of a third set of resources associated with a dynamic A/N feedback message, wherein the second set of resources and the third set of resources are associated with a collision, as described above.

As further shown in FIG. 8, in some aspects, process 800 may include performing an action associated with at least one of the SPS A/N feedback message or the dynamic A/N feedback message based at least in part on the second set of resources and the third set of resources being associated with the collision (block 830). For example, the UE (e.g., using communication manager 140 and/or collision handling component 1008, depicted in FIG. 10) may perform an action associated with at least one of the SPS A/N feedback message or the dynamic A/N feedback message based at least in part on the second set of resources and the third set of resources being associated with the collision, as described above.

As further shown in FIG. 8, in some aspects, process 800 may include transmitting at least one of the SPS A/N feedback message or the dynamic A/N feedback message based at least in part on performing the action (block 840). For example, the UE (e.g., using communication manager 140 and/or transmission component 1004, depicted in FIG. 10) may transmit at least one of the SPS A/N feedback message or the dynamic A/N feedback message based at least in part on performing the action, as described above.

Process 800 may include additional aspects, such as any single aspect or any combination of aspects described below and/or in connection with one or more other processes described elsewhere herein.

In a first aspect, the action is based at least in part on whether the dynamic A/N feedback message is to be transmitted with one or more repetitions.

In a second aspect, alone or in combination with the first aspect, the action is based at least in part on whether any repetitions of the dynamic A/N feedback message are scheduled to occur before the second set of resources in the time domain.

In a third aspect, alone or in combination with one or more of the first and second aspects, the dynamic A/N feedback message is to be transmitted without repetitions, and performing the action includes appending the SPS A/N feedback message with the dynamic A/N feedback message based at least in part on a codebook associated with the dynamic A/N feedback message, and transmitting at least one of the SPS A/N feedback message or the dynamic A/N feedback message includes transmitting, using the third set of resources associated with the dynamic A/N feedback message, the SPS A/N feedback message and the dynamic A/N feedback message based at least in part on appending the SPS A/N feedback message with the dynamic A/N feedback message.

In a fourth aspect, alone or in combination with one or more of the first through third aspects, no repetitions of the dynamic A/N feedback message are scheduled to occur before the second set of resources in the time domain, and performing the action includes appending the SPS A/N feedback message with the dynamic A/N feedback message based at least in part on a codebook associated with the dynamic A/N feedback message, and transmitting at least one of the SPS A/N feedback message or the dynamic A/N feedback message includes transmitting, using the third set of resources associated with the dynamic A/N feedback message, the SPS A/N feedback message and the dynamic A/N feedback message based at least in part on appending the SPS A/N feedback message with the dynamic A/N feedback message.

In a fifth aspect, alone or in combination with one or more of the first through fourth aspects, the dynamic A/N feedback message is to be transmitted with one or more repetitions, wherein the action includes appending the SPS A/N feedback message with the dynamic A/N feedback message, and transmitting at least one of the SPS A/N feedback message or the dynamic A/N feedback message includes transmitting, across all repetitions of the dynamic A/N feedback message, the SPS A/N feedback message and the dynamic A/N feedback message based at least in part on appending the SPS A/N feedback message with the dynamic A/N feedback message.

In a sixth aspect, alone or in combination with one or more of the first through fifth aspects, the action includes appending the SPS A/N feedback message with the dynamic A/N feedback message, and performing the action includes comparing a first priority associated with the SPS A/N feedback message to a second priority associated with the dynamic A/N feedback message; and appending the SPS A/N feedback message with the dynamic A/N feedback message based at least in part on a codebook associated with the dynamic A/N feedback message, wherein appending the SPS A/N feedback message with the dynamic A/N feedback message includes: compressing the SPS A/N feedback message prior to appending if the first priority associated with the SPS A/N feedback message is lower than the second priority associated with the dynamic A/N feedback message; or appending, without compressing the SPS A/N feedback message, the SPS A/N feedback message with the dynamic A/N feedback message if the first priority associated with the SPS A/N feedback message is a same priority as or a higher priority than the second priority associated with the dynamic A/N feedback message.

In a seventh aspect, alone or in combination with one or more of the first through sixth aspects, the dynamic A/N feedback message is to be transmitted with one or more repetitions, and performing the action includes refraining from transmitting one of the SPS A/N feedback message or the dynamic A/N feedback message based at least in part on the dynamic A/N feedback message being transmitted with the one or more repetitions.

In an eighth aspect, alone or in combination with one or more of the first through seventh aspects, at least one repetition of the dynamic A/N feedback message is scheduled to occur before the second set of resources associated with the SPS A/N feedback message in the time domain, and performing the action includes refraining from transmitting one of the SPS A/N feedback message or the dynamic A/N feedback message based at least in part on the at least one repetition of the dynamic A/N feedback message being scheduled to occur before the second set of resources associated with the SPS A/N feedback message in the time domain.

In an ninth aspect, alone or in combination with one or more of the first through eighth aspects, performing the action includes refraining from transmitting the SPS A/N feedback message if a first priority associated with the SPS A/N feedback message is the same as or lower than a second priority associated with the dynamic A/N feedback message, or refraining from transmitting the dynamic A/N feedback message if the first priority associated with the SPS A/N feedback message is higher than the second priority associated with the dynamic A/N feedback message.

In a tenth aspect, alone or in combination with one or more of the first through ninth aspects, refraining from transmitting the dynamic A/N feedback message includes refraining from transmitting one or more repetitions of the dynamic A/N feedback message that are associated with the collision in the time domain with the second set of resources associated with the SPS A/N feedback message, and transmitting at least one of the SPS A/N feedback message or the dynamic A/N feedback message includes transmitting, using the second set of resources, the SPS A/N feedback message, and transmitting any repetitions of the dynamic A/N feedback message that do not collide with the second set of resources associated with the SPS A/N feedback message.

In an eleventh aspect, alone or in combination with one or more of the first through tenth aspects, receiving the indication of the first set of resources includes receiving an indication of a first priority associated with the SPS A/N feedback message.

In a twelfth aspect, alone or in combination with one or more of the first through eleventh aspects, receiving the indication of the third set of resources includes receiving an indication of a second priority associated with the dynamic A/N feedback message.

In a thirteenth aspect, alone or in combination with one or more of the first through twelfth aspects, a size of the third set of resources is based at least in part on the second set of resources and the third set of resources being associated with the collision.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
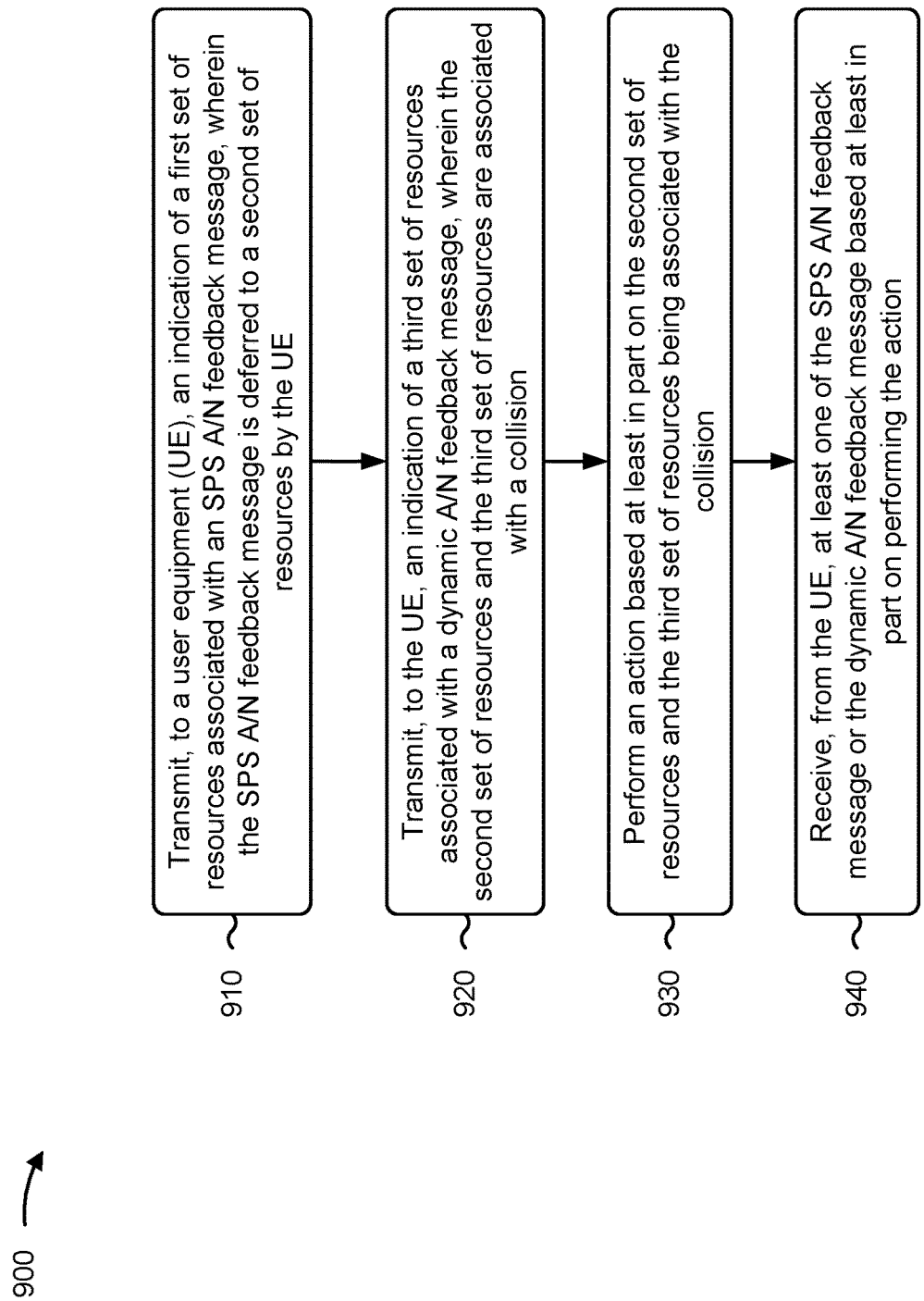

FIG. 9 is a diagram illustrating an example process 900 performed, for example, by a network entity, in accordance with the present disclosure. Example process 900 is an example where the network entity (e.g., base station 110, a CU, a DU, and/or an RU, among other examples) performs operations associated with collision resolution for ACK or NACK acknowledgement feedback messages.

As shown in FIG. 9, in some aspects, process 900 may include transmitting, to a UE, an indication of a first set of resources associated with an SPS A/N feedback message, wherein the SPS A/N feedback message is deferred to a second set of resources by the UE (block 910). For example, the network entity (e.g., using communication manager 150 and/or transmission component 1104, depicted in FIG. 11) may transmit, to a UE, an indication of a first set of resources associated with an SPS A/N feedback message, wherein the SPS A/N feedback message is deferred to a second set of resources by the UE, as described above.

As further shown in FIG. 9, in some aspects, process 900 may include transmitting, to the UE, an indication of a third set of resources associated with a dynamic A/N feedback message, wherein the second set of resources and the third set of resources are associated with a collision (block 920). For example, the network entity (e.g., using communication manager 150 and/or transmission component 1104, depicted in FIG. 11) may transmit, to the UE, an indication of a third set of resources associated with a dynamic A/N feedback message, wherein the second set of resources and the third set of resources are associated with a collision, as described above.

As further shown in FIG. 9, in some aspects, process 900 may include performing an action based at least in part on the second set of resources and the third set of resources being associated with the collision (block 930). For example, the network entity (e.g., using communication manager 150 and/or collision handling component 1108, depicted in FIG. 11) may perform an action based at least in part on the second set of resources and the third set of resources being associated with the collision, as described above.

As further shown in FIG. 9, in some aspects, process 900 may include receiving, from the UE, at least one of the SPS A/N feedback message or the dynamic A/N feedback message based at least in part on performing the action (block 940). For example, the network entity (e.g., using communication manager 150 and/or reception component 1102, depicted in FIG. 11) may receive, from the UE, at least one of the SPS A/N feedback message or the dynamic A/N feedback message based at least in part on performing the action, as described above.

Process 900 may include additional aspects, such as any single aspect or any combination of aspects described below and/or in connection with one or more other processes described elsewhere herein.

In a first aspect, the action is based at least in part on whether the dynamic A/N feedback message is to be received with one or more repetitions.

In a second aspect, alone or in combination with the first aspect, the action is based at least in part on whether any repetitions of the dynamic A/N feedback message are scheduled to occur before the second set of resources.

In a third aspect, alone or in combination with one or more of the first and second aspects, the dynamic A/N feedback message is to be received without repetitions, and receiving at least one of the SPS A/N feedback message or the dynamic A/N feedback message includes receiving, using the third set of resources associated with the dynamic A/N feedback message, an appended message including the SPS A/N feedback message and the dynamic A/N feedback message, and performing the action includes decoding the appended message based at least in part on identifying that the SPS A/N feedback message is to be appended with the dynamic A/N feedback message.

In a fourth aspect, alone or in combination with one or more of the first through third aspects, no repetitions of the dynamic A/N feedback message are scheduled to occur before the second set of resources in the time domain, and receiving at least one of the SPS A/N feedback message or the dynamic A/N feedback message includes receiving, using the third set of resources associated with the dynamic A/N feedback message, an appended message including the SPS A/N feedback message and the dynamic A/N feedback message, and performing the action includes decoding the appended message based at least in part on identifying that the SPS A/N feedback message is to be appended with the dynamic A/N feedback message.

In a fifth aspect, alone or in combination with one or more of the first through fourth aspects, the dynamic A/N feedback message is to be received with one or more repetitions, wherein the SPS A/N feedback message is appended with the dynamic A/N feedback message, and receiving at least one of the SPS A/N feedback message or the dynamic A/N feedback message includes receiving, across all repetitions of the dynamic A/N feedback message, an appended message including the SPS A/N feedback message and the dynamic A/N feedback message, and performing the action includes decoding each repetition of the dynamic A/N feedback message based at least in part on identifying that each repetition includes the SPS A/N feedback message appended with the dynamic A/N feedback message.

In a sixth aspect, alone or in combination with one or more of the first through fifth aspects, the SPS A/N feedback message is appended with the dynamic A/N feedback message, and performing the action includes comparing a first priority associated with the SPS A/N feedback message to a second priority associated with the dynamic A/N feedback message, and identifying a size of an appended message that includes the SPS A/N feedback message and the dynamic A/N feedback message based at least in part on comparing the first priority to the second priority.

In a seventh aspect, alone or in combination with one or more of the first through sixth aspects, the dynamic A/N feedback message is to be received with one or more repetitions, and performing the action includes refraining from receiving one of the SPS A/N feedback message or the dynamic A/N feedback message based at least in part on the dynamic A/N feedback message being received with one or more repetitions.

In an eighth aspect, alone or in combination with one or more of the first through seventh aspects, at least one repetition of the dynamic A/N feedback message is scheduled to occur before the second set of resources associated with the SPS A/N feedback message in the time domain, and performing the action includes refraining from receiving one of the SPS A/N feedback message or the dynamic A/N feedback message based at least in part on the at least one repetition of the dynamic A/N feedback message being scheduled to occur before the second set of resources associated with the SPS A/N feedback message in the time domain.

In a ninth aspect, alone or in combination with one or more of the first through eighth aspects, performing the action includes refraining from receiving the SPS A/N feedback message if a first priority associated with the SPS A/N feedback message is the same as or lower than a second priority associated with the dynamic A/N feedback message, or refraining from receiving the dynamic A/N feedback message if the first priority associated with the SPS A/N feedback message is higher than the second priority associated with the dynamic A/N feedback message.

In a tenth aspect, alone or in combination with one or more of the first through ninth aspects, refraining from receiving the dynamic A/N feedback message includes refraining from receiving one or more repetitions of the dynamic A/N feedback message that are associated with the collision with the second set of resources, and receiving at least one of the SPS A/N feedback message or the dynamic A/N feedback message includes receiving, using the second set of resources, the SPS A/N feedback message, and receiving any repetitions of the dynamic A/N feedback message that do not collide with the second set of resources associated with the SPS A/N feedback message.

In an eleventh aspect, alone or in combination with one or more of the first through tenth aspects, transmitting the indication of the first set of resources includes transmitting an indication of a first priority associated with the SPS A/N feedback message.

In a twelfth aspect, alone or in combination with one or more of the first through eleventh aspects, transmitting the indication of the third set of resources includes transmitting an indication of a second priority associated with the dynamic A/N feedback message.

In a thirteenth aspect, alone or in combination with one or more of the first through twelfth aspects, a size of the third set of resources is based at least in part on at least one of the action or the second set of resources and the third set of resources being associated with the collision.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
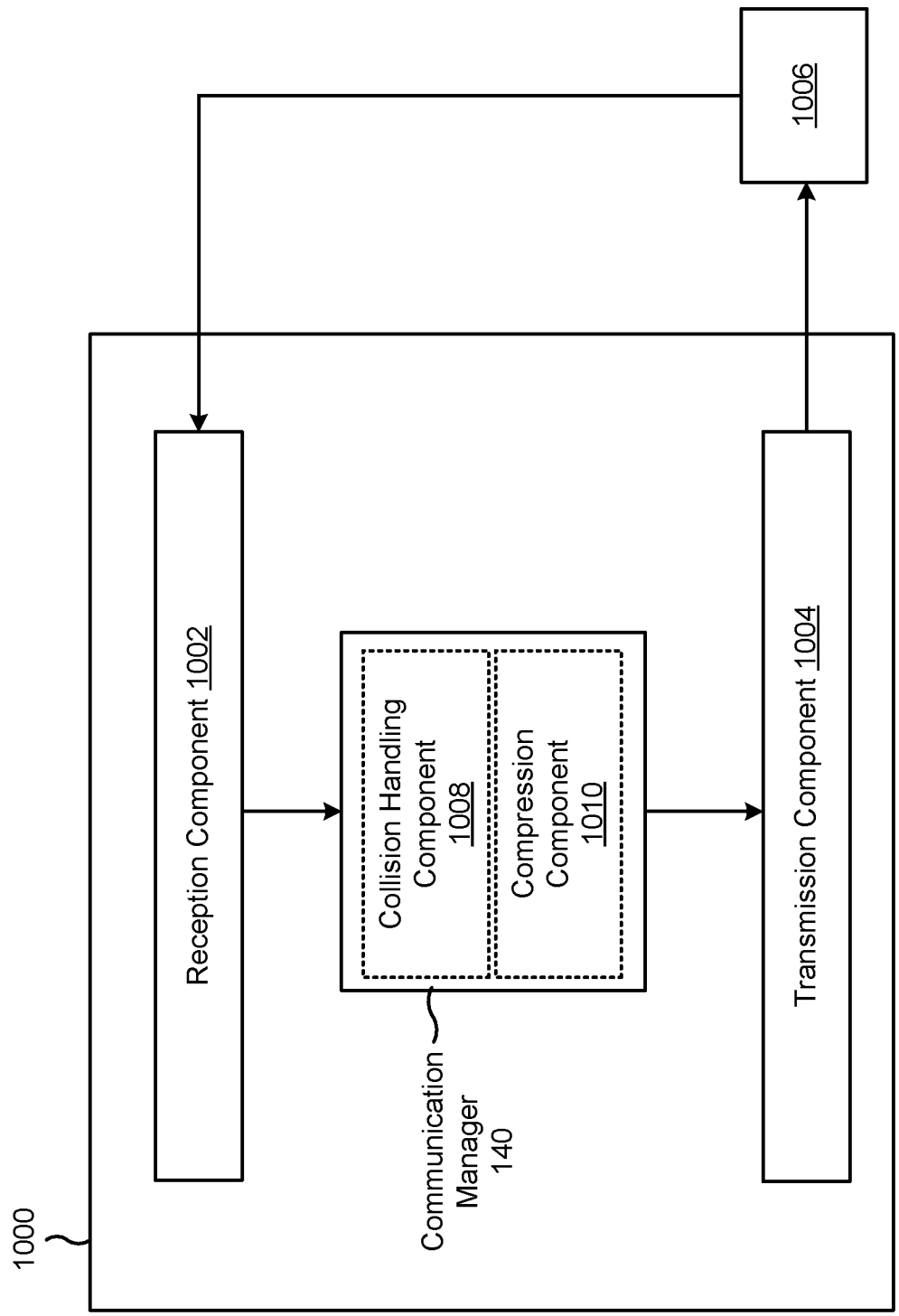
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a collision handling component 1008, and/or a compression component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive an indication of a first set of resources associated with an SPS A/N feedback message, wherein the SPS A/N feedback message is deferred to a second set of resources by the apparatus 1000. The reception component 1002 may receive an indication of a third set of resources associated with a dynamic A/N feedback message, wherein the second set of resources and the third set of resources are associated with a collision. The collision handling component 1008 may perform an action associated with at least one of the SPS A/N feedback message or the dynamic A/N feedback message based at least in part on the second set of resources and the third set of resources being associated with the collision. The transmission component 1004 may transmit at least one of the SPS A/N feedback message or the dynamic A/N feedback message based at least in part on performing the action.

The collision handling component 1008 may append the SPS A/N feedback message with the dynamic A/N feedback message based at least in part on a codebook associated with the dynamic A/N feedback message. The transmission component 1004 may transmit, using the third set of resources associated with the dynamic A/N feedback message, the SPS A/N feedback message and the dynamic A/N feedback message based at least in part on appending the SPS A/N feedback message with the dynamic A/N feedback message.

The collision handling component 1008 may append the SPS A/N feedback message with the dynamic A/N feedback message based at least in part on a codebook associated with the dynamic A/N feedback message based at least in part on no repetitions of the dynamic A/N feedback message being scheduled to occur before the second set of resources in the time domain.

The transmission component 1004 may transmit, across all repetitions of the dynamic A/N feedback message, the SPS A/N feedback message and the dynamic A/N feedback message based at least in part on appending the SPS A/N feedback message with the dynamic A/N feedback message.

The collision handling component 1008 may compare a first priority associated with the SPS A/N feedback message to a second priority associated with the dynamic A/N feedback message. The collision handling component 1008 may append the SPS A/N feedback message with the dynamic A/N feedback message based at least in part on a codebook associated with the dynamic A/N feedback message. The compression component 1010 may compress the SPS A/N feedback message prior to appending if the first priority associated with the SPS A/N feedback message is lower than the second priority associated with the dynamic A/N feedback message. The collision handling component 1008 may append, without compressing the SPS A/N feedback message, the SPS A/N feedback message with the dynamic A/N feedback message if the first priority associated with the SPS A/N feedback message is a same priority as or a higher priority than the second priority associated with the dynamic A/N feedback message.

The collision handling component 1008 may refrain from transmitting one of the SPS A/N feedback message or the dynamic A/N feedback message based at least in part on the dynamic A/N feedback message being transmitted with the one or more repetitions. The collision handling component 1008 may refrain from transmitting one of the SPS A/N feedback message or the dynamic A/N feedback message based at least in part on the at least one repetition of the dynamic A/N feedback message being scheduled to occur before the second set of resources associated with the SPS A/N feedback message in the time domain.

The collision handling component 1008 may refrain from transmitting the SPS A/N feedback message if a first priority associated with the SPS A/N feedback message is the same as or lower than a second priority associated with the dynamic A/N feedback message. The collision handling component 1008 may refrain from transmitting the dynamic A/N feedback message if the first priority associated with the SPS A/N feedback message is higher than the second priority associated with the dynamic A/N feedback message.

The collision handling component 1008 may refrain from transmitting one or more repetitions of the dynamic A/N feedback message that are associated with the collision with the second set of resources associated with the SPS A/N feedback message. The transmission component 1004 may transmit, using the second set of resources, the SPS A/N feedback message. The transmission component 1004 may transmit any repetitions of the dynamic A/N feedback message that do not collide with the second set of resources associated with the SPS A/N feedback message.

The reception component 1002 may receive an indication of a first priority associated with the SPS A/N feedback message. The reception component 1002 may receive an indication of a second priority associated with the dynamic A/N feedback message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
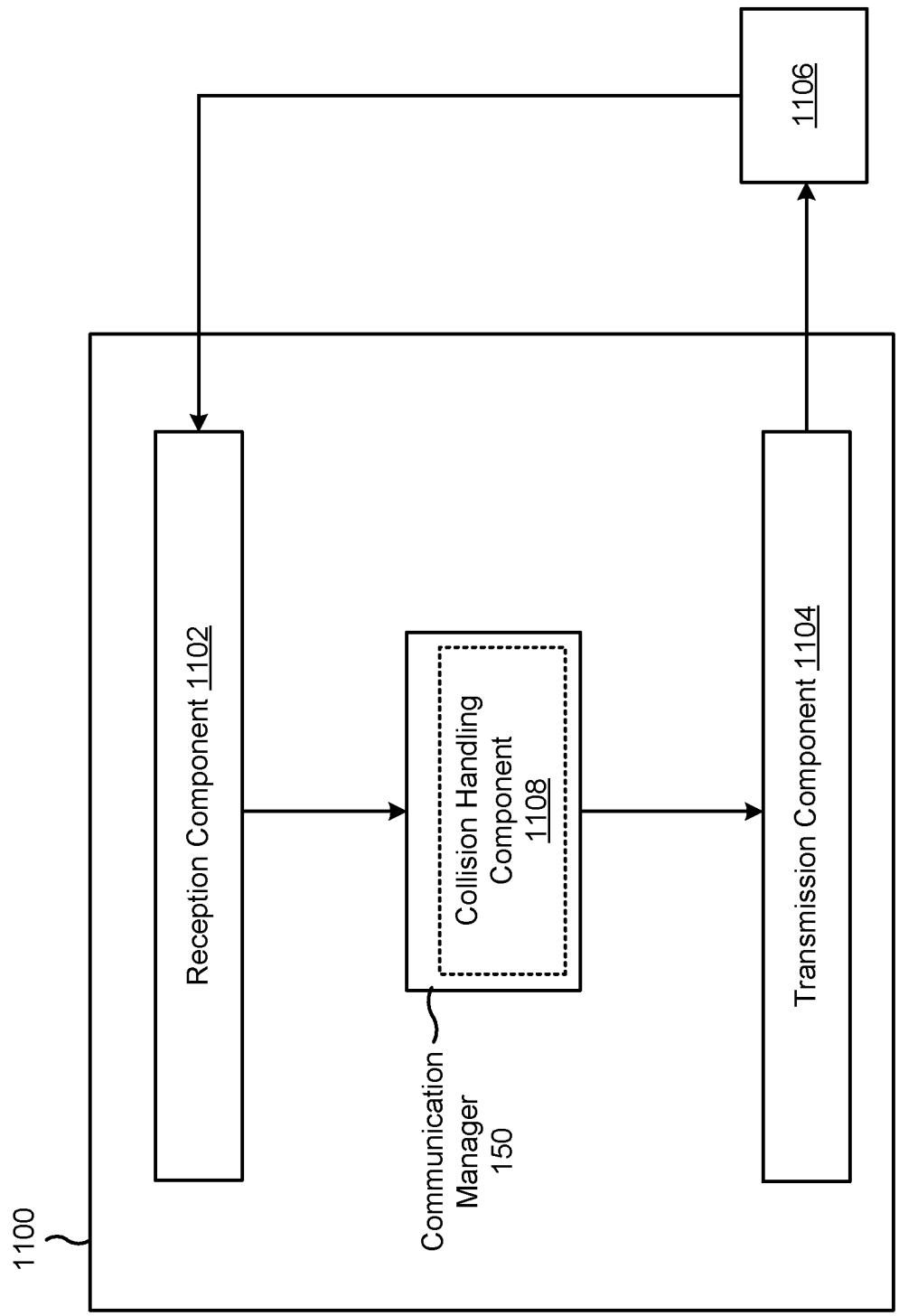

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a collision handling component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an indication of a first set of resources associated with SPS A/N feedback message, wherein the SPS A/N feedback message is deferred to a second set of resources by the UE. The transmission component 1104 may transmit, to the UE, an indication of a third set of resources associated with a dynamic A/N feedback message, wherein the second set of resources and the third set of resources are associated with a collision. The collision handling component 1108 may perform an action based at least in part on the second set of resources and the third set of resources being associated with the collision. The reception component 1102 may receive, from the UE, at least one of the SPS A/N feedback message or the dynamic A/N feedback message based at least in part on performing the action.

The reception component 1102 may receive, using the third set of resources associated with the dynamic A/N feedback message, an appended message including the SPS A/N feedback message and the dynamic A/N feedback message. The collision handling component 1108 may decode the appended message based at least in part on identifying that the SPS A/N feedback message is to be appended with the dynamic A/N feedback message.

The reception component 1102 may receive, across all repetitions of the dynamic A/N feedback message, an appended message including the SPS A/N feedback message and the dynamic A/N feedback message. The collision handling component 1108 may decode each repetition of the dynamic A/N feedback message based at least in part on identifying that each repetition includes the SPS A/N feedback message appended with the dynamic A/N feedback message.

The collision handling component 1108 may compare a first priority associated with the SPS A/N feedback message to a second priority associated with the dynamic A/N feedback message. The collision handling component 1108 may identify a size of an appended message that includes the SPS A/N feedback message and the dynamic A/N feedback message based at least in part on comparing the first priority to the second priority.

The collision handling component 1108 may refrain from receiving one of the SPS A/N feedback message or the dynamic A/N feedback message based at least in part on the dynamic A/N feedback message being received with one or more repetitions.

The collision handling component 1108 may refrain from receiving one of the SPS A/N feedback message or the dynamic A/N feedback message based at least in part on the at least one repetition of the dynamic A/N feedback message being scheduled to occur before the second set of resources associated with the SPS A/N feedback message in the time domain.

The collision handling component 1108 may refrain from receiving the SPS A/N feedback message if a first priority associated with the SPS A/N feedback message is the same as or lower than a second priority associated with the dynamic A/N feedback message. The collision handling component 1108 may refrain from receiving the dynamic A/N feedback message if the first priority associated with the SPS A/N feedback message is higher than the second priority associated with the dynamic A/N feedback message.

The collision handling component 1108 may refrain from receiving one or more repetitions of the dynamic A/N feedback message that are associated with a collision with the second set of resources. The reception component 1102 may receive, using the second set of resources, the SPS A/N feedback message. The reception component 1102 may receive any repetitions of the dynamic A/N feedback message that do not collide with the second set of resources associated with the SPS A/N feedback message.

The transmission component 1104 may transmit an indication of a first priority associated with the SPS A/N feedback message. The transmission component 1104 may transmit an indication of a second priority associated with the dynamic A/N feedback message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an indication of a first set of resources associated with a semi-persistent scheduling (SPS) acknowledgement/negative acknowledgement (A/N) feedback message, wherein the SPS A/N feedback message is deferred to a second set of resources by the UE; receiving an indication of a third set of resources associated with a dynamic A/N feedback message, wherein the second set of resources and the third set of resources are associated with a collision; performing an action associated with at least one of the SPS A/N feedback message or the dynamic A/N feedback message based at least in part on the second set of resources and the third set of resources being associated with the collision; and transmitting at least one of the SPS A/N feedback message or the dynamic A/N feedback message based at least in part on performing the action.

Aspect 2: The method of Aspect 1, wherein the action is based at least in part on whether the dynamic A/N feedback message is to be transmitted with one or more repetitions.

Aspect 3: The method of any of Aspects 1-2, wherein the action is based at least in part on whether any repetitions of the dynamic A/N feedback message are scheduled to occur before the second set of resources in a time domain.

Aspect 4: The method of any of Aspects 1-3, wherein the dynamic A/N feedback message is to be transmitted without repetitions, and wherein performing the action comprises: appending the SPS A/N feedback message with the dynamic A/N feedback message based at least in part on a codebook associated with the dynamic A/N feedback message; and wherein transmitting at least one of the SPS A/N feedback message or the dynamic A/N feedback message comprises: transmitting, using the third set of resources associated with the dynamic A/N feedback message, the SPS A/N feedback message and the dynamic A/N feedback message based at least in part on appending the SPS A/N feedback message with the dynamic A/N feedback message.

Aspect 5: The method of any of Aspects 1-3, wherein no repetitions of the dynamic A/N feedback message are scheduled to occur before the second set of resources in a time domain, and wherein performing the action comprises: appending the SPS A/N feedback message with the dynamic A/N feedback message based at least in part on a codebook associated with the dynamic A/N feedback message; and wherein transmitting at least one of the SPS A/N feedback message or the dynamic A/N feedback message comprises: transmitting, using the third set of resources associated with the dynamic A/N feedback message, the SPS A/N feedback message and the dynamic A/N feedback message based at least in part on appending the SPS A/N feedback message with the dynamic A/N feedback message.

Aspect 6: The method of any of Aspects 1-3 and 5, wherein the dynamic A/N feedback message is to be transmitted with one or more repetitions, wherein the action includes appending the SPS A/N feedback message with the dynamic A/N feedback message, and wherein transmitting at least one of the SPS A/N feedback message or the dynamic A/N feedback message comprises: transmitting, across all repetitions of the dynamic A/N feedback message, the SPS A/N feedback message and the dynamic A/N feedback message based at least in part on appending the SPS A/N feedback message with the dynamic A/N feedback message.

Aspect 7: The method of any of Aspects 1-6, wherein the action includes appending the SPS A/N feedback message with the dynamic A/N feedback message, and wherein performing the action comprises: comparing a first priority associated with the SPS A/N feedback message to a second priority associated with the dynamic A/N feedback message; and appending the SPS A/N feedback message with the dynamic A/N feedback message based at least in part on a codebook associated with the dynamic A/N feedback message, wherein appending the SPS A/N feedback message with the dynamic A/N feedback message includes: compressing the SPS A/N feedback message prior to appending if the first priority associated with the SPS A/N feedback message is lower than the second priority associated with the dynamic A/N feedback message; or appending, without compressing the SPS A/N feedback message, the SPS A/N feedback message with the dynamic A/N feedback message if the first priority associated with the SPS A/N feedback message is a same priority as or a higher priority than the second priority associated with the dynamic A/N feedback message.

Aspect 8: The method of any of Aspects 1-3, wherein the dynamic A/N feedback message is to be transmitted with one or more repetitions, and wherein performing the action comprises: refraining from transmitting one of the SPS A/N feedback message or the dynamic A/N feedback message based at least in part on the dynamic A/N feedback message being transmitted with the one or more repetitions.

Aspect 9: The method of any of Aspects 1-3 and 8, wherein at least one repetition of the dynamic A/N feedback message is scheduled to occur before the second set of resources associated with the SPS A/N feedback message in a time domain, and wherein performing the action comprises: refraining from transmitting one of the SPS A/N feedback message or the dynamic A/N feedback message based at least in part on the at least one repetition of the dynamic A/N feedback message being scheduled to occur before the second set of resources associated with the SPS A/N feedback message in the time domain.

Aspect 10: The method of any of Aspects 1-3 and 8-9, wherein performing the action comprises: refraining from transmitting the SPS A/N feedback message if a first priority associated with the SPS A/N feedback message is a same priority as, or lower than, a second priority associated with the dynamic A/N feedback message; or refraining from transmitting the dynamic A/N feedback message if the first priority associated with the SPS A/N feedback message is higher than the second priority associated with the dynamic A/N feedback message.

Aspect 11: The method of Aspect 10, wherein refraining from transmitting the dynamic A/N feedback message comprises: refraining from transmitting one or more repetitions of the dynamic A/N feedback message that are associated with the collision with the second set of resources associated with the SPS A/N feedback message; and wherein transmitting at least one of the SPS A/N feedback message or the dynamic A/N feedback message comprises: transmitting, using the second set of resources, the SPS A/N feedback message; and transmitting any repetitions of the dynamic A/N feedback message that do not collide with the second set of resources associated with the SPS A/N feedback message.

Aspect 12: The method of any of Aspects 1-11, wherein receiving the indication of the first set of resources comprises receiving an indication of the first priority associated with the SPS A/N feedback message.

Aspect 13: The method of any of Aspects 1-12, wherein receiving the indication of the third set of resources comprises receiving an indication of the second priority associated with the dynamic A/N feedback message.

Aspect 14: The method of any of Aspects 1-13, wherein a size of the third set of resources is based at least in part on the second set of resources and the third set of resources being associated with the collision.

Aspect 15: A method of wireless communication performed by a network entity, comprising: transmitting, to a user equipment (UE), an indication of a first set of resources associated with a semi-persistent scheduling (SPS) acknowledgement/negative acknowledgement (A/N) feedback message, wherein the SPS A/N feedback message is deferred to a second set of resources by the UE; transmitting, to the UE, an indication of a third set of resources associated with a dynamic A/N feedback message, wherein the second set of resources and the third set of resources are associated with a collision; performing an action based at least in part on the second set of resources and the third set of resources being associated with the collision; and receiving, from the UE, at least one of the SPS A/N feedback message or the dynamic A/N feedback message based at least in part on performing the action.

Aspect 16: The method of Aspect 15, wherein the action is based at least in part on whether the dynamic A/N feedback message is to be received with one or more repetitions.

Aspect 17: The method of any of Aspects 15-16, wherein the action is based at least in part on whether any repetitions of the dynamic A/N feedback message are scheduled to occur before the second set of resources.

Aspect 18: The method of any of Aspects 15-17, wherein the dynamic A/N feedback message is to be received without repetitions, and wherein receiving at least one of the SPS A/N feedback message or the dynamic A/N feedback message comprises: receiving, using the third set of resources associated with the dynamic A/N feedback message, an appended message including the SPS A/N feedback message and the dynamic A/N feedback message; and wherein performing the action comprises decoding the appended message based at least in part on identifying that the SPS A/N feedback message is to be appended with the dynamic A/N feedback message.

Aspect 19: The method of any of Aspects 15-17, wherein no repetitions of the dynamic A/N feedback message are scheduled to occur before the second set of resources in a time domain, and wherein receiving at least one of the SPS A/N feedback message or the dynamic A/N feedback message comprises: receiving, using the third set of resources associated with the dynamic A/N feedback message, an appended message including the SPS A/N feedback message and the dynamic A/N feedback message; and wherein performing the action comprises decoding the appended message based at least in part on identifying that the SPS A/N feedback message is to be appended with the dynamic A/N feedback message.

Aspect 20: The method of any of Aspects 15-17 and 19, wherein the dynamic A/N feedback message is to be received with one or more repetitions, wherein the SPS A/N feedback message is appended with the dynamic A/N feedback message, and wherein receiving at least one of the SPS A/N feedback message or the dynamic A/N feedback message comprises: receiving, across all repetitions of the dynamic A/N feedback message, an appended message including the SPS A/N feedback message and the dynamic A/N feedback message; and wherein performing the action comprises decoding each repetition of the dynamic A/N feedback message based at least in part on identifying that each repetition includes the SPS A/N feedback message appended with the dynamic A/N feedback message.

Aspect 21: The method of any of Aspects 15-20, wherein the SPS A/N feedback message is appended with the dynamic A/N feedback message, and wherein performing the action comprises: comparing a first priority associated with the SPS A/N feedback message to a second priority associated with the dynamic A/N feedback message; and identifying a size of an appended message that includes the SPS A/N feedback message and the dynamic A/N feedback message based at least in part on comparing the first priority to the second priority.

Aspect 22: The method of any of Aspects 15-17, wherein the dynamic A/N feedback message is to be received with one or more repetitions, and wherein performing the action comprises: refraining from receiving one of the SPS A/N feedback message or the dynamic A/N feedback message based at least in part on the dynamic A/N feedback message being received with one or more repetitions.

Aspect 23: The method of any of Aspects 15-17 and 22, wherein at least one repetition of the dynamic A/N feedback message is scheduled to occur before the second set of resources associated with the SPS A/N feedback message in a time domain, and wherein performing the action comprises: refraining from receiving one of the SPS A/N feedback message or the dynamic A/N feedback message based at least in part on the at least one repetition of the dynamic A/N feedback message being scheduled to occur before the second set of resources associated with the SPS A/N feedback message in the time domain.

Aspect 24: The method of any of Aspects 15-17 and 22-23, wherein performing the action comprises: refraining from receiving the SPS A/N feedback message if a first priority associated with the SPS A/N feedback message is a same priority as, or lower than, a second priority associated with the dynamic A/N feedback message; or refraining from receiving the dynamic A/N feedback message if the first priority associated with the SPS A/N feedback message is higher than the second priority associated with the dynamic A/N feedback message.

Aspect 25: The method of Aspect 24, wherein refraining from receiving the dynamic A/N feedback message comprises: refraining from receiving one or more repetitions of the dynamic A/N feedback message that are associated with the collision with the second set of resources; and wherein receiving at least one of the SPS A/N feedback message or the dynamic A/N feedback message comprises: receiving, using the second set of resources, the SPS A/N feedback message; and receiving any repetitions of the dynamic A/N feedback message that do not collide with the second set of resources associated with the SPS A/N feedback message.

Aspect 26: The method of any of Aspects 15-25, wherein transmitting the indication of the first set of resources comprises transmitting an indication of the first priority associated with the SPS A/N feedback message.

Aspect 27: The method of any of Aspects 15-26, wherein transmitting the indication of the third set of resources comprises transmitting an indication of the second priority associated with the dynamic A/N feedback message.

Aspect 28: The method of any of Aspects 15-27, wherein a size of the third set of resources is based at least in part on at least one of the action or the second set of resources and the third set of resources being associated with the collision.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising: a memory; and
one or more processors, coupled to the memory, configured to:
receive an indication of a first set of resources associated with a semi-persistent scheduling (SPS) acknowledgement/negative acknowledgement (A/N) feedback message, wherein the SPS A/N feedback message is deferred to a second set of resources by the UE;
receive an indication of a third set of resources associated with a dynamic A/N feedback message, wherein the second set of resources and the third set of resources are associated with a collision; perform an action associated with at least one of the SPS A/N feedback message or the dynamic A/N feedback message based at least in part on the second set of resources and the third set of resources being associated with the collision; and
transmit the at least one of the SPS A/N feedback message or the dynamic A/N feedback message based at least in part on performing the action, wherein the action is based at least in part on whether any repetitions of the dynamic A/N feedback message are scheduled to occur before the second set of resources in a time domain.

2. The UE of claim 1, wherein the action is based at least in part on whether the dynamic A/N feedback message is to be transmitted with one or more repetitions.

3. The UE of claim 1, wherein the dynamic A/N feedback message is to be transmitted without repetitions, and wherein the one or more processors, to perform the action, are configured to:
append the SPS A/N feedback message with the dynamic A/N feedback message based at least in part on a codebook associated with the dynamic A/N feedback message; and
wherein the one or more processors, to transmit at least one of the SPS A/N feedback message or the dynamic A/N feedback message, are configured to:
transmit, using the third set of resources associated with the dynamic A/N feedback message, the SPS A/N feedback message and the dynamic A/N feedback message based at least in part on appending the SPS A/N feedback message with the dynamic A/N feedback message.

4. The UE of claim 1, wherein no repetitions of the dynamic A/N feedback message are scheduled to occur before the second set of resources in a time domain, and wherein the one or more processors, to perform the action, are configured to:
append the SPS A/N feedback message with the dynamic A/N feedback message based at least in part on a codebook associated with the dynamic A/N feedback message; and
wherein the one or more processors, to transmit at least one of the SPS A/N feedback message or the dynamic A/N feedback message, are configured to:
transmit, using the third set of resources associated with the dynamic A/N feedback message, the SPS A/N feedback message and the dynamic A/N feedback message based at least in part on appending the SPS A/N feedback message with the dynamic A/N feedback message.

5. The UE of claim 1, wherein the dynamic A/N feedback message is to be transmitted with one or more repetitions, wherein the action includes appending the SPS A/N feedback message with the dynamic A/N feedback message, and wherein the one or more processors, to transmit at least one of the SPS A/N feedback message or the dynamic A/N feedback message, are configured to:
  transmit, across all repetitions of the dynamic A/N feedback message, the SPS A/N feedback message and the dynamic A/N feedback message based at least in part on appending the SPS A/N feedback message with the dynamic A/N feedback message.

6. The UE of claim 1, wherein the dynamic A/N feedback message is to be transmitted with one or more repetitions, and wherein the one or more processors, to perform the action, are configured to:
  refrain from transmitting one of the SPS A/N feedback message or the dynamic A/N feedback message based at least in part on the dynamic A/N feedback message being transmitted with the one or more repetitions.

7. The UE of claim 1, wherein at least one repetition of the dynamic A/N feedback message is scheduled to occur before the second set of resources associated with the SPS A/N feedback message in a time domain, and wherein the one or more processors, to perform the action, are configured to:
  refrain from transmitting one of the SPS A/N feedback message or the dynamic A/N feedback message based at least in part on the at least one repetition of the dynamic A/N feedback message being scheduled to occur before the second set of resources associated with the SPS A/N feedback message in the time domain.

8. The UE of claim 1, wherein the one or more processors, to perform the action, are configured to:
  refrain from transmitting the SPS A/N feedback message if a first priority associated with the SPS A/N feedback message is a same priority as, or lower than, a second priority associated with the dynamic A/N feedback message; or
  refrain from transmitting the dynamic A/N feedback message if the first priority associated with the SPS A/N feedback message is higher than the second priority associated with the dynamic A/N feedback message.

9. The UE of claim 8, wherein the one or more processors, to refrain from transmitting the dynamic A/N feedback message, are configured to: refrain from transmitting one or more repetitions of the dynamic A/N feedback message that are associated with the collision with the second set of resources associated with the SPS A/N feedback message; and wherein the one or more processors, to transmit at least one of the SPS A/N feedback message or the dynamic A/N feedback message, are configured to: transmit, using the second set of resources, the SPS A/N feedback message; and transmit any repetitions of the dynamic A/N feedback message that do not collide with the second set of resources associated with the SPS A/N feedback message.

10. The UE of claim 1, wherein the one or more processors, to receive the indication of the first set of resources, are configured to receive an indication of a first priority associated with the SPS A/N feedback message.

11. The UE of claim 1, wherein the one or more processors, to receive the indication of the third set of resources, are configured to receive an indication of a second priority associated with the dynamic A/N feedback message.

12. The UE of claim 1, wherein a size of the third set of resources is based at least in part on the second set of resources and the third set of resources being associated with the collision.

13. A network entity for wireless communication, comprising: a memory; and one or more processors, coupled to the memory, configured to:
  transmit, to a user equipment (UE), an indication of a first set of resources associated with a semi-persistent scheduling (SPS) acknowledgement/negative acknowledgement (A/N) feedback message, wherein the SPS A/N feedback message is deferred to a second set of resources by the UE;
  transmit, to the UE, an indication of a third set of resources associated with a dynamic A/N feedback message, wherein the second set of resources and the third set of resources are associated with a collision;
  perform an action based at least in part on the second set of resources and the third set of resources being associated with the collision; and receive, from the UE, at least one of the SPS A/N feedback message or the dynamic A/N feedback message based at least in part on performing the action,
  wherein the dynamic A/N feedback message is to be received without repetitions, and wherein the one or more processors, to receive at least one of the SPS A/N feedback message or the dynamic A/N feedback message, are configured to: receive, using the third set of resources associated with the dynamic A/N feedback message, an appended message including the SPS A/N feedback message and the dynamic A/N feedback message; and wherein the one or more processors, to perform the action, are configured to decode the appended message based at least in part on identifying that the SPS A/N feedback message is to be appended with the dynamic A/N feedback message.

14. A method of wireless communication performed by a user equipment (UE), comprising: receiving an indication of a first set of resources associated with a semi-persistent scheduling (SPS) acknowledgement/negative acknowledgement (A/N) feedback message, wherein the SPS A/N feedback message is deferred to a second set of resources by the UE;
  receiving an indication of a third set of resources associated with a dynamic A/N feedback message, wherein the second set of resources and the third set of resources are associated with a collision;
  performing an action associated with at least one of the SPS A/N feedback message or the dynamic A/N feedback message based at least in part on the second set of resources and the third set of resources being associated with the collision; and
  transmitting at least one of the SPS A/N feedback message or the dynamic A/N feedback message based at least in part on performing the action, wherein the action is based at least in part on whether any repetitions of the dynamic A/N feedback message are scheduled to occur before the second set of resources in a time domain.

15. The method of claim 14, wherein the action is based at least in part on whether the dynamic A/N feedback message is to be transmitted with one or more repetitions.

16. The method of claim 14, wherein the dynamic A/N feedback message is to be transmitted without repetitions, and wherein performing the action comprises:
  appending the SPS A/N feedback message with the dynamic A/N feedback message based at least in part on a codebook associated with the dynamic A/N feedback message; and wherein transmitting at least one of the SPS A/N feedback message or the dynamic A/N feedback message comprises:
  transmitting, using the third set of resources associated with the dynamic A/N feedback message, the SPS A/N feedback message and the dynamic A/N feedback message based at least in part on appending the SPS A/N feedback message with the dynamic A/N feedback message.

17. The method of claim 14, wherein no repetitions of the dynamic A/N feedback message are scheduled to occur before the second set of resources in a time domain, and wherein performing the action comprises:
appending the SPS A/N feedback message with the dynamic A/N feedback message based at least in part on a codebook associated with the dynamic A/N feedback message; and wherein transmitting at least one of the SPS A/N feedback message or the dynamic A/N feedback message comprises:
transmitting, using the third set of resources associated with the dynamic A/N feedback message, the SPS A/N feedback message and the dynamic A/N feedback message based at least in part on appending the SPS A/N feedback message with the dynamic A/N feedback message.

18. The method of claim 14, wherein the dynamic A/N feedback message is to be transmitted with one or more repetitions, wherein the action includes appending the SPS A/N feedback message with the dynamic A/N feedback message, and wherein transmitting at least one of the SPS A/N feedback message or the dynamic A/N feedback message comprises:
transmitting, across all repetitions of the dynamic A/N feedback message, the SPS A/N feedback message and the dynamic A/N feedback message based at least in part on appending the SPS A/N feedback message with the dynamic A/N feedback message.

19. The method of claim 14, wherein the dynamic A/N feedback message is to be transmitted with one or more repetitions, and wherein performing the action comprises: refraining from transmitting one of the SPS A/N feedback message or the dynamic A/N feedback message based at least in part on the dynamic A/N feedback message being transmitted with the one or more repetitions.

20. The method of claim 14, wherein at least one repetition of the dynamic A/N feedback message is scheduled to occur before the second set of resources associated with the SPS A/N feedback message in a time domain, and wherein performing the action comprises: refraining from transmitting one of the SPS A/N feedback message or the dynamic A/N feedback message based at least in part on the at least one repetition of the dynamic A/N feedback message being scheduled to occur before the second set of resources associated with the SPS A/N feedback message in the time domain.

21. The method of claim 14, wherein performing the action comprises:
refraining from transmitting the SPS A/N feedback message if a first priority associated with the SPS A/N feedback message is a same priority as, or lower than, a second priority associated with the dynamic A/N feedback message; or refraining from transmitting the dynamic A/N feedback message if the first priority associated with the SPS A/N feedback message is higher than the second priority associated with the dynamic A/N feedback message.

22. The method of claim 21, wherein refraining from transmitting the dynamic A/N feedback message comprises:
refraining from transmitting one or more repetitions of the dynamic A/N feedback message that are associated with the collision with the second set of resources associated with the SPS A/N feedback message; and
wherein transmitting at least one of the SPS A/N feedback message or the dynamic A/N feedback message comprises: transmitting, using the second set of resources, the SPS A/N feedback message; and transmitting any repetitions of the dynamic A/N feedback message that do not collide with the second set of resources associated with the SPS A/N feedback message.

23. The method of claim 14, wherein receiving the indication of the first set of resources comprises receiving an indication of a first priority associated with the SPS A/N feedback message.

24. The method of claim 14, wherein receiving the indication of the third set of resources comprises receiving an indication of a second priority associated with the dynamic A/N feedback message.

25. The method of claim 14, wherein a size of the third set of resources is based at least in part on the second set of resources and the third set of resources being associated with the collision.

26. A method of wireless communication performed by a network entity, comprising: transmitting, to a user equipment (UE), an indication of a first set of resources associated with a semi-persistent scheduling (SPS) acknowledgement/negative acknowledgement (A/N) feedback message, wherein the SPS A/N feedback message is deferred to a second set of resources by the UE;
transmitting, to the UE, an indication of a third set of resources associated with a dynamic A/N feedback message, wherein the second set of resources and the third set of resources are associated with a collision;
performing an action based at least in part on the second set of resources and the third set of resources being associated with the collision; and
receiving, from the UE, at least one of the SPS A/N feedback message or the dynamic A/N feedback message based at least in part on performing the action; wherein the dynamic A/N feedback message is to be received without repetitions, and wherein receiving at least one of the SPS A/N feedback message or the dynamic A/N feedback message comprises: receiving, using the third set of resources associated with the dynamic A/N feedback message, an appended message including the SPS A/N feedback message and the dynamic A/N feedback message; and wherein performing the action comprises decoding the appended message based at least in part on identifying that the SPS A/N feedback message is to be appended with the dynamic A/N feedback message.

* * * * *